United States Patent [19]

Cieciuch et al.

[11] 4,098,783

[45] Jul. 4, 1978

[54] DYE SUBSTITUTED CYCLIC 1,3-SULFUR-NITROGEN COMPOUNDS AS DYE IMAGE-FORMING MATERIALS IN PHOTOGRAPHY

[75] Inventors: Ronald F. W. Cieciuch; Roberta R. Luhowy, both of Newton; Frank A. Meneghini, Arlington; Howard G. Rogers, Weston, all of Mass.

[73] Assignee: Polaroid Corporation, Cambridge, Mass.

[21] Appl. No.: 681,620

[22] Filed: Apr. 29, 1976

Related U.S. Application Data

[60] Continuation-in-part of Ser. No. 465,694, Apr. 30, 1974, abandoned, which is a continuation-in-part of Ser. No. 317,168, Dec. 21, 1972, abandoned, which is a division of Ser. No. 155,123, Jun. 17, 1971, Pat. No. 3,719,489.

[51] Int. Cl.[2] .................... C09B 29/36; C09B 29/38; C09B 45/04; C09B 45/06

[52] U.S. Cl. .................... 260/147; 96/29 D; 96/64; 260/146 R; 260/158; 260/162; 260/163; 260/202; 260/278; 260/299; 260/303; 260/304 R; 260/306.7 R; 260/314.5; 260/340.9 R; 260/543 R; 260/556 AR; 542/423

[58] Field of Search .................... 260/158, 306.7, 304, 260/240 G, 369, 370, 372, 374, 378, 299, 146 R, 147, 304 R, 306.7 R, 306.7 T, 303, 278; 96/64, 59 D; 542/423

[56] References Cited

U.S. PATENT DOCUMENTS

| | | | |
|---|---|---|---|
| 2,815,338 | 12/1957 | Ruegg | 260/152 |
| 3,148,062 | 9/1964 | Whitmore et al. | 260/162 X |
| 3,179,650 | 4/1965 | Wehrli et al. | 260/158 |
| 3,398,134 | 8/1968 | Ball et al. | 260/157 |
| 3,522,266 | 7/1970 | Burns | 260/306.7 |
| 3,632,340 | 1/1972 | Illingsworth | 96/64 |

*Primary Examiner*—Floyd D. Higel

*Attorney, Agent, or Firm*—Sybil A. Campbell

[57] ABSTRACT

This invention relates to color providing compounds useful as dye image-forming materials in color photographic processes. These compounds comprise a complete dye, i.e., a dye radical comprising the chromophoric system of a dye, such as, an azo, anthraquinone, azomethine or phthalocyanine dye and a cyclic moiety capable of undergoing cleavage in the presence of silver ion and/or soluble silver complex containing the group

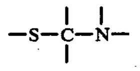

wherein said C atom common to said S and N atoms is a tetrahedral carbon atom possessing 4 single covalent bonds. Preferred compounds comprise the radical of an organic dye substituted with $[(L)_{m-1}\text{-}Y]$ wherein L is a divalent organic linking group containing at least one carbon atom, *m* is a positive integer 1 or 2, and Y is a cyclic moiety selected from

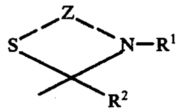

(a)

wherein $R^1$ is hydrogen or a monovalent organic radical; $R^2$ is hydrogen or a monovalent hydrocarbon radical; and Z represents the carbon atoms necessary to complete a ring system having 4 to 20 atoms, said cyclic moiety (a) being attached to a carbon atom of said dye by a single covalent bond when *m* is 1 and attached to the carbon atom of said linking group L by a single covalent bond when *m* is 2 and

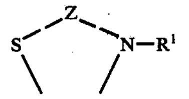

(b)

wherein $R^1$ and Z have the same meaning given above, said cyclic moiety (b) being attached to a carbon atom of said dye by a spiro union when *m* is 1 and attached to the carbon atom of said linking group L by a spiro union when *m* is 2.

50 Claims, 2 Drawing Figures

DYE SUBSTITUTED CYCLIC 1,3-SULFUR-NITROGEN COMPOUNDS AS DYE IMAGE-FORMING MATERIALS IN PHOTOGRAPHY

CROSS REFERENCE TO RELATED PATENT APPLICATIONS

This application is a continuation-in-part of our copending application Ser. No. 465,694 filed Apr. 30, 1974 now abandoned which, in turn, is a continuation-in-part of our copending U.S. application Ser. No. 317,168 filed Dec. 21, 1972 now abandoned which, in turn, is a division of our U.S. application Ser. No. 155,123 filed June 17, 1971, now U.S. Pat. No. 3,719,489 issued Mar. 6, 1973.

BACKGROUND OF THE INVENTION

1.Field of the Invention

This invention relates to photographic processes for providing an imagewise distribution of a reagent, such as photographically active reagent or a dye and particularly to processes for the formation of color images and to photographic products useful therein.

2. Description of the Prior Art

Diffusion transfer photographic processes are now well-known. In preparing silver images according to such processes, an exposed photosensitive element comprising a light-sensitive silver halide emulsion is developed by treating the emulsion with a processing composition comprising an aqueous alkaline solution of a silver halide developing agent and a silver halide solvent. The developable silver halide of the emulsion is reduced to image silver by the developing agent while the silver halide solvent forms an imagewise distribution of a soluble silver complex with the undeveloped silver halide. This imagewise distribution of soluble silver complex is, at least in part, transferred by imbibition to a superposed image-receiving layer where it is reduced to form a silver transfer image.

It has been proposed in U.S. Pat. No. 3,443,941 of Howard G. Rogers to utilize certain principles of the silver diffusion transfer art in the formation of color images. In particular, it has been proposed to utilize the properties of the imagewise distribution of silver ions in the soluble silver complex to control imagewise transfer of a color-providing substance to a suitable receiving stratum to provide a color image thereon.

Included among the color-providing materials disclosed as useful in such a system are (A) normally diffusible color-providing materials that are rendered non-diffusible upon reaction with silver ions and/or a soluble silver complex containing the same and (B) normally non-diffusible color-providing materials that are rendered diffusible upon reaction with silver ions and/or a soluble silver complex containing the same. Such color-providing materials include complete dyes or dye intermediates which form a complete dye upon subsequent reaction.

It is known that various chemical reactions are assisted by silver ion including reactions involving cleavage of a compound into one or more fragments. One example of a cleavage reaction that is assisted by silver ion is the silver ion-accelerated hydrolysis of mono thio analogs of tetrahydropyranyl ethers as disclosed in U.S. Pat. No. 3,068,099. Other examples of such reactions are the silver ion-accelerated cleavage of disulfides and of thioesters as discussed by L. F. Lindoy, Coordin. Chem.

Rev., 4 (1969), 41–71 and the silver ion-accelerated elimination of mercaptan in the preparation of carbodiimides, isocyanates and isothiocyanates as discussed by A. F. Ferris et al., J. Org. Chem., 28, 71–74 (1968). Further examples of such reactions are the selective removal of certain S-protecting groups from cysteines using silver ion as discussed by L. Zervas et al., J. Am. Chem. Soc., 84, 3887–3891 (1962) and the silver ion-accelerated hydrolysis of silyl acetylenic compounds as reported in Rec. trav. chim. des Pays-Bas 86, 1138 (1967).

Besides the above reactions, it is also known that heavy metal ions, particularly mercuric and silver ions, accelerate cleavage of certain cyclic and linear 1,3-sulfur-nitrogen compounds, i.e., compounds having a sulfur atom and a nitrogen atom, each linked by a single bond to a common carbon atom. Such compounds undergo cleavage in a stepwise fashion between the S atom and the C atom common to the S and N atoms and also between the N atom and the common C atom. As discussed in *The Chemistry of Penicillins,* National Academy of Sciences, Washington, D. C., pages 926 and 927, the cleavage of thiazolidines by mercury salts has become standard practice in the inactivation of penicillin compounds. It is also mentioned in this reference that certain thiazolidine compounds undergo cleavage in the presence of silver ion. The cleavage of benzothiazolines accelerated by the presence of various metal ions including silver ion is reported in the aforementioned Lindoy reference, while the cleavage of certain linear compounds containing the sulfur-carbon-nitrogen configuration assisted by mercuric and silver ions is reported by T. Yamaguichi et al., Bulletin of the Chemical Society of Japan, 40, 1952–1954 (1967).

Though certain thiazolidine compounds have been used in photographic processes, for example, to improve ratios of speed to fog as described in U.S. Pat. 3,565,625, such compounds have not been used in a photographic system to provide an imagewise distribution of a reagent.

SUMMARY OF THE INVENTION

According to the present invention, it has been found that cleavage reactions assisted by silver ion may be used in photographic processes to liberate a reagent in an imagewise fashion. For example, it has been found that compounds capable of undergoing cleavage in the presence of ionic silver such as those mentioned above, may be used to release a reagent as a smaller molecule in an imagewise distribution corresponding to the imagewise distribution of silver ions made available as a function of development of an exposed silver halide layer.

It is, therefore, the primary object of the present invention to provide processes employing photographically inert compounds which are stable in the photographic processing solution but capable of undergoing cleavage in the presence of the imagewise distribution of silver ions made available in the undeveloped and partially developed areas of a silver halide emulsion during processing of the emulsion to liberate a reagent as a smaller molecule, preferably, a photographically active reagent or a dye in an imagewise distribution corresponding to said imagewise distribution of silver ions.

It is another object of the present invention to provide processes employing photographically inert compounds to release an imagewise distribution of an aldehyde.

It is another object of the present invention to provide processes for preparing color images by using, as the photographically inert componds, color-providing compounds which are stable and substantially non-diffusible in the photographic processing solution but capable of undergoing cleavage in the presence of the imagewise distribution of silver ions made available in the undeveloped and partially developed areas of a silver halide emulsion during processing thereof to liberate a more mobile and diffusible color-providing moiety as an imagewise distribution corresponding to said imagewise distribution of silver ions.

It is a further object of the present invention to provide photographic products useful in processes for releasing a photographic reagent which contain photographically inert compounds stable in aqueous media but capable of undergoing cleavage in the presence of silver ions made available in an imagewise distribution during processing of a silver halide emulsion to split off a photographic reagent as a smaller molecule in an imagewise distribution corresponding to said imagewise distribution of silver ions. It is yet a further object of the present invention to provide novel compounds comprising a dye and a cyclic moiety containing the group

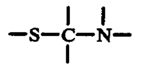

in the ring.

Other objects of the invention will in part be obvious and will in part appear hereinafter.

The invention accordingly comprises the several steps and the relation and order of one or more of such steps with respect to each of the others, and the product possessing the features, properties and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing.

DESCRIPTION OF THE PREFERRED EMBODIMENTS

Figure 1:
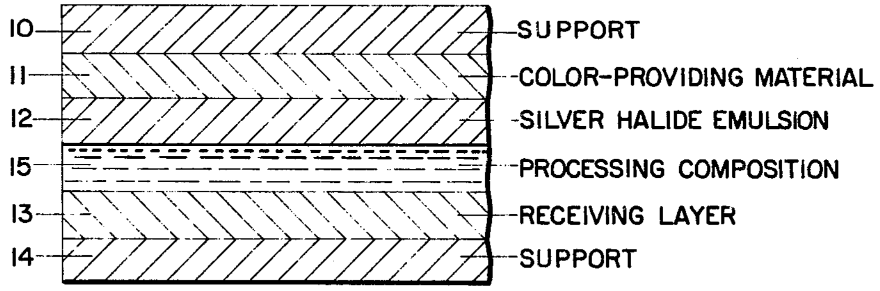
FIG. 1 is an enlarged, diagrammatic, fragmentary sectional view illustrating the preparation of a color image according to one aspect of this invention.

As noted previously, the present invention is concerned with utilizing the imagewise distribution of silver ions and/or a soluble silver complex containing the same made available as a function of development to effect cleavage of a photographically inert compound which may be diffusible or non-diffusible in the photographic processing composition to release a reagent as a smaller molecule in an imagewise distribution corresponding to the imagewise distribution of said silver ions and/or said soluble silver complex, which reagent also may be diffusible or substantially non-diffusible in the processing composition.

According to one system of the present invention, a photographic process for producing an imagewise distribution of a reagent is provided which includes the steps of developing a photosensitive element comprising an exposed silver halide emulsion with an aqueous processing composition; forming in undeveloped areas an imagewise distribution of silver ions; contacting said imagewise distribution of silver ions with a photographically inert compound capable of undergoing cleavage in the presence of silver ions to liberate a reagent; and forming as a function of contacting said imagewise distribution of silver ions with said inert compound, a corresponding imagewise distribution of said reagent.

In forming color images according to this system, a relatively non-diffusible color-providing compound may be present, for example, in a layer associated with a light-sensitive silver halide emulsion which, after being exposed, is developed with an aqueous alkaline processing solution including a silver halide developing agent and a silver halide solvent. The imagewise distribution of silver ions such as contained in the soluble silver complex made available during processing of the emulsion migrates to the associated color-providing material which undergoes cleavage in the presence of the complex to provide an imagewise distribution of a more diffusible color-providing moiety. The subsequent formation of a color image is the result of the differential in diffusibility between the parent material and liberated color-providing moiety whereby the imagewise distribution of the more diffusible color-providing moiety released in undeveloped and partially developed areas is free to transfer. For example, where the imagewise distribution of diffusible color-providing moiety is a complete dye, it may be simply washed away to leave an image associated with the emulsion, or it may be transferred by imbibition to an image-receiving layer, e.g., a dyeable stratum of the character heretofore known in the art to provide a color transfer image thereon.

Besides a color-providing moiety, the smaller molecule liberated from the parent compound upon cleavage may be any one of various reagents and preferably is photographically active, such as, a gelatin hardener, a development restrainer, toning agent or antifoggant. Depending upon the reagent it is intended to liberate, the appropriate moiety may be substituted on the parent compound, or the parent compound itself upon cleavage may provide a fragment possessing the desired photographic activity. The respective mobility characteristics of the parent compound and of the liberated reagent may be substantially the same, or they may be different as appropriate for a given photographic process.

A differential in diffusibility between the parent compound and the reagent liberated therefrom may be achieved in various ways, for example, by using a normally immobile and non-diffusible parent compound which upon cleavage releases a diffusible reagent, or conversely, by using a normally mobile parent compound which upon cleavage releases a reagent that is substantially non-diffusible.

To be useful in the present invention, the parent compound should be photographically inert and stable in the processing solution, i.e., should remain intact in the processing composition in the absence of silver ion at least during the processing interval, but should be capable of undergoing cleavage in the presence of the imagewise distribution of silver ions and/or the imagewise distribution of soluble silver complex containing silver ions made available as a function of development to release a reagent, such as, a dye or a photographically active reagent. Its rate of cleavage in the presence of silver ion, however, should be such that an imagewise distribution of reagent is obtained that corresponds to the imagewise distribution of silver ions or soluble silver complex formed in the partially exposed and unexposed areas of the emulsion. If the rate of cleavage is excessive, reagent may be released to some extent in the exposed areas.

Illustrated below are examples of compounds which may be used to release a reagent, such as, a color-providing moiety and the silver accelerated cleavage reactions which they undergo.

(1)

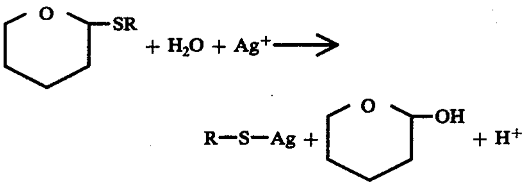

(2)

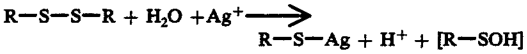

(3)

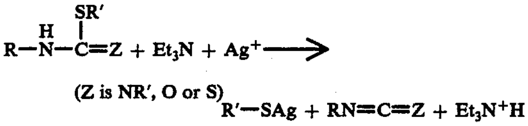

(4)

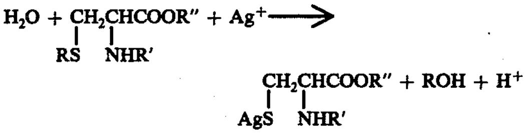

(5)

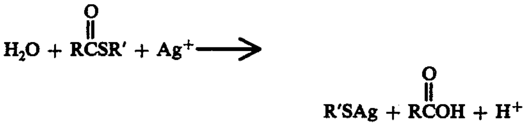

(6)

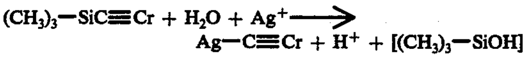

(7)

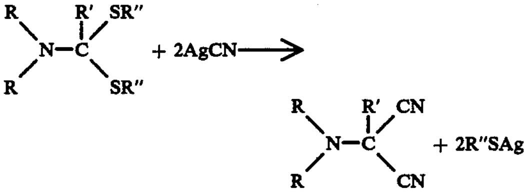

(8)

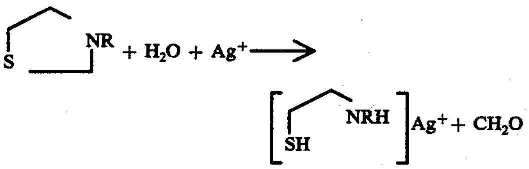

For use in the present invention, the above compounds may be appropriately substituted with the desired color-providing or other moiety it is desired to liberate and with other group(s) as may be necessary to achieve a differential in diffusibility between the uncleaved parent compound and the reagent released therefrom. Where such a differential in diffusibility is necessary or desired for the particular photographic process, the parent compound may be substituted with an immobilizing group or "anchor", that renders the compound substantially non-diffusible in the processing solution, or, rather than a single immobilizing group, the parent compound may be substituted with two or more groups which together preclude migration of the compound from its position in the photographic element. When several groups together are used to immobilize the compound, one or more of the groups may be on the fragment to be released as a diffusible reagent so long as the group(s) does not reduce to any appreciable extent the mobility and diffusibility of the fragement subsequent to cleavage.

It will be appreciated that where a single immobilizing group is used to anchor the parent compound, its position on the compound should be such that upon cleavage, it will be on a fragment different from the fragment to be released as the diffusible reagent. Depending upon the photographic process used and upon the location of the parent compound in the photographic element, it may be preferable to position the immobilizing group on that portion of the parent compound that ultimately forms a complex with the silver ion. For example, when producing positive transfer images using diffusion transfer techniques, it is preferred to anchor the fragment that will complex the silver ion in the photosensitive element to avoid possible staining of the color image formed in the image-receiving sheet.

The selection of a particular immobilizng group(s) for anchoring the parent compound will depend primarily on whether it is desired to employ only one immobilizing group or to employ two or more groups which together are capable of anchoring the compound. Where two or more groups are employed to immobolize the compound, lower alkyl groups, butyl or hexyl, for example, may be used to achieve the requisite differential in diffusibility between the parent compound and the reagent released. Where only one group is used to immobilize the compound, it is more effective to employ, for example, a higher alkyl radical such as octyl, decyl, dodecyl, stearyl, and oleyl or a carbocyclic or heterocylic ring having six members or more. Where cyclic compounds are employed the carbocyclic or heterocyclic immobilizing group may be bonded to a single atom or to adjacent atoms of the parent molecule and may be bonded to a single atom by a valence or ionic bond or through a spiro union.

As the "color-providing moiety" in forming color images according to the present invention, there may be used a complete dye or a dye intermediate capable of yielding a complete dye upon subsequent reaction, for example, upon reaction with a suitable coupler to form a complete dye. The coupling reaction may take place directly in the image-receiving layer, or it may take place in the emulsion layer or in the layer of processing composition after which the complete dye formed diffuses to the image-receiving layer.

Complete dyes which may be used as the color-providing moiety may comprise any of the general classes of dyes heretofore known in the art, for example, nitro, azo, thiazole, di- and triphenyl methane, cyanine and anthraquinone dyes. Dye intermediates include any molecule which when released is capable of forming a dye upon reaction with another molecule. For example, a dye intermediate may be released from a sulfur-nitrogen compound, e.g. a thiazolidine, which intermediate in turn reacts with another molecule to produce a complete dye. Photographic processes and products utilizing dye-forming systems wherein an imagewise distribution of a complete dye is produced by the reaction of an aldehyde or ketone dye intermediate and a color-forming reagent comprises the subject matter of copending U.S. Patent Application Serial No. 155,000 of Louis Locatell, Jr., Frank A. Meneghini and Howard G. Rogers and now U.S. Pat. No. 3,719,488 issued Mar. 6, 1973.

The color-providing moiety, whether a complete dye or dye former, may be linked directly to an atom of the parent molecule by a valance or ionic bond or through a spiro union, or it may be linked indirectly to the parent molecule through an appropriate linking group either acyclic or cyclic. Typical linking groups include cycloalkyl, such as cyclohexyl; —CONH—; -alkylene—CONH—; arylene—CONH—; alkylene; and arylene wherein alkylene may be ethylene, propylene, butylene and arylene may be phenylene. The term color-providing moiety as used herein includes any linking group and the moiety may contain on the color-providing and/or linking portion various solubilizing substituents, e.g., sulfo, hydroxyl or carboxyl groups to adjust its solubility characteristics.

In addition to the above, useful dyes include those which are colorless or of a color other than that ultimately desired in a certain environment, such as at a particular pH level, but upon a change in environment, e.g., from acid to alkaline conditions, take on a color change. Color-providing materials of this nature include indicator dyes and leuco dyes. It is also contemplated that dyes may be employed which undergo a color shift or change in spectral absorption characteristics during or after processing. Such dyes may be referred to as "temporarily shifted" dyes. The temporary shift may, for example, be effected by acylation, the acyl group being removable by hydrolysis in the alkaline processing composition. It is also within the scope of the present invention to employ metal complexed or complexable dyes and to employ dyes, the non-complexed forms of which are substantially colorless, but which, when complexed during or subsequent to image formation, are of the desired color.

Though some of the compounds enumerated above may cleave in the absence of silver ion under extreme conditions, such as strong heating, they are sufficiently stable under neutral, acid and alkaline conditions at ambient temperatures to remain intact under the processing conditions encountered in conventional and diffusion transfer photography until silver ion becomes available as a function of development. However, the reactivities of the various compounds toward silver ion may vary and thus, some compounds may cleave more rapidly in the presence of silver ion than others. Accordingly, it will be appreciated that the particular compound selected should have the cleavage rate necessary for obtaining an imagewise distribution of the desired reagent, such as a color-providing moiety, under the particular processing conditions employed. In diffusion transfer processes, it is desirable that the parent compound cleave in the presence of silver ion and/or soluble silver complex containing silver ion to release a diffusible color-providing moiety such that a transfer image is obtained within a reasonable processing time.

Of the aforementioned classes of compounds, the 1,3-sulfur-nitrogen compounds have been found especially satisfactory. As discussed above, these compounds may be linear, or they may be cyclic in structure with either or both of the S and N atoms being constituents of the ring which should contain at least four atoms. The compounds may be saturated or unsaturated provided the S and N atoms each are bonded to the common, i.e., intermediate, carbon atom by a single bond.

Among the 1,3-sulfur-nitrogen compounds that may be used in the present invention are those represented in the following formulae:

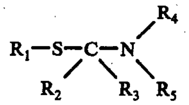

(I)

wherein $R_1$ and $R_5$ each are a monovalent organic radical and $R_2$, $R_3$ and $R_4$ each are hydrogen or a monovalent organic radical;

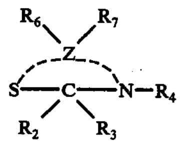

(II)

wherein $R_2$, $R_3$ and $R_4$ have the same meaning as in formula (I) above; $R_6$ and $R_7$ on the same or different atoms each are hydrogen or monovalent organic radical and taken together represent a substituted or unsubstituted carbocyclic or heterocyclic ring; Z rperesents the atoms, preferably carbon atoms, necessary to complete a ring system having up to 20 members;

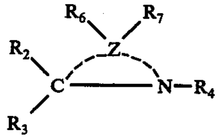

(III)

wherein $R_2$, $R_3$, $R_4$, $R_6$, $R_7$ and Z have the same meaning as in formula (II) above; and

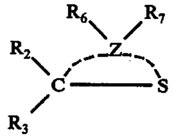

(IV)

wherein $R_2$, $R_3$, $R_6$, $R_7$ and Z have the same meaning as in formula (II) above.

Examples of cyclic compounds which may be used in the present invention are thiazolidines, tetrahydro-1,3-thiazines, benzothiazolines, benzimidazolines, tetrahydrothiophenes, s-trithianes, 1,3-dithianes, tetrahydrothiopyrans, 1,3-dithiolanes, pyrrolidines imidazolidines, hexahydro-s-triazines, piperazines, piperidines, and morpholines. Where the ring contains a nitrogen atom but no sulfur atom or wherein the ring contains a sulfur atom but no nitrogen atom, the compound will be appropriately substituted with a sulfur or nirogen-contaning group to obtain the 1,3-sulfur-nitrogen configuration. For example, in Formula (IV) above, the sulfur-nitrogen configuration may be obtained by selecting as the $R_2$ or $R_3$ group, a monovalent organic radical

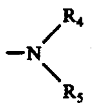

or — N = R wherein $R_4$ and $R_5$ have the same meaning given above and R is a divalent orhanic radical. Likewise, the desired configuration may be obtaned with compounds of Formula (III) by selecting as $R_4$, a monovalent organic radical

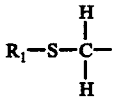

or by selecting as the $R_2$ or $R_3$ group, a monovalent organic radical - S - $R_1$ wherein $R_1$ has the same meaning given above. It will be appreciated that the compound may contain more than one sulfur-nitrogen configuration if it is desired to release several smaller molecules. As an illustration, the compound of Formula (II) may be substituted with a cyclic 1,3-sulfur-nitrogen substituent in the 2-position through a linking group, such as a methylene group, to give, e.g., a bis compound.

It will be understood that at least one of the substituents of the compounds illustrated in the above formulae will be the color-providing or other moiety it is desired to release as the reagent from the parent compound, which moiety may be released as an amine, aldehyde, ketone, etc., depending upon the position of the substituent on the parent. Also, one or more of the R substituents may be selected to immobilize the compound in processes where it is desired to render the uncleaved parent compound sustantially non-diffusible in the processing solution, or one or more of the R substituents may be seleced to enhance the solubility of the compound in processes where it is desired to render the parent compound diffusible in the processing solution. Suitable immobilizing and solubilizing groups have been enumerated above. The positioning of these groups on the parent compound will depend upon the diffusibility characteristics desired for the parent compound and for the smaller molecule released upon cleavage in a given process. As noted previously, the parent and the reagent liberated therefrom may exhibit the same or different diffusibility characteristics in the photographic processing solution. Both may be non-diffusible, both may be diffusible or one may be diffusible and the other non-diffusible. In addition to the immobilizing and/or solubilizing groups, it will be appreciated that R groups may comprise other substituents which do not interfere with the use of the compound to liberate a selected reagent, such as, a color-providing moiety or a photographically active reagent.

Typical of the substituents that may be used in the above formulae include carboxy, sulfo, nitro, hydroxy, halo, e.g., chloro and bromo, cyano and hydrocarbon radicals including aliphatic, cycloaliphatic, aromatic and heterocyclic radicals. The radicals may possess ethylenic or acetylenic unsaturation, and the carbon chains may be interrupted by heteroatoms or heteroatom groups, such as, S, O, N, SO, NH and so forth. Also, the radicals may contain substituents, e.g., phenyl, alkyl, alkyl ether, aryl ether, carbalkoxy, carboxy, hydroxy, sulfo, halo, cyano, nitro, and alkylamino.

Examples of suitable radicals are substituted and unsubstituted alkyl groups, such as, methyl, ethyl, octyl, dodecyl; substituted and unsubstituted cycloalkyl radicals, such as, cyclohexyl, cyclopentyl, cycloctyl; substituted and unsubstituted alkenyl groups, such as, vinyl, allyl, butenyl, decenyl, octadienyl, hexatrienyl; substituted and unsubstituted cycloalkenyl groups, such as, cyclopentenyl, cycloheptenyl, cyclohexadienyl, substituted and unsubstituted alkynyl groups, such as, ethynyl, hexynyl, octynyl; substituted and unsubstituted aryl radicals, such as, phenyl, tolyl, benzyl and napthyl; and substituted and unsubstituted heterocyclic groups, such as those having a 4-, 5- or 6-membered ring and containing O, N, S, and combinations thereof derived from, e.g., pyrrole, pyrazole, oxazole, thiazole, imidazole, pyrimidine, piperidine, piperazine, thiophene, pyrrolidine, azetidine. Where a single hydrocarbon moiety is used as the immobilizing group, higher acyl radicals such as oleoyl and stearoyl groups have been found useful.

It will be appreciated by those skilled in the art that the vinyl and phenylene analogs of the above sulfur-nitrogen compounds, including those exemplified in formulae (I) - (IV), are useful in the present invention. The 1,3-sulfur-nitrogen compounds and their vinyl and phenylene analogs may be defined as containing the group,

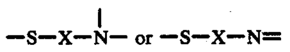

wherein X is

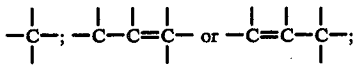

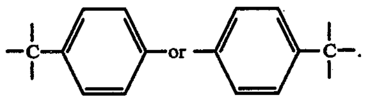

As in the compounds illustrated in formulae (I) - (IV), the above analogs may be substituted with an immobilizing group and/or solubilizing group and with a moiety it is desired to release as the reagent, e.g., a color-providing moiety.

Compounds found especially suitable for forming images by diffusion transfer are certain cyclic sulfur-nitrogen compounds where both the S and N atoms are included in the ring, particularly thiazolidines and benzothiazolines. These compounds exhibit the desired stability in the processing composition, and in the presence of silver ions undergo cleavage at the desired rate to release a reagent, e.g., a color-providing moiety in an imagewise distribution corresponding to that of the silver ions and/or soluble silver complex containing the same made available in the undeveloped areas of the emulsion. Besides exhibiting these characteristics under the highly alkaline conditions ordinarily employed in diffusion transfer processes, they may be employed under neutral and acid conditions as well. Also, it will be appreciated that these and other 1,3-sulfur-nitrogen compounds, both cyclic and linear, and their vinyl and phenylene analogs may be used to liberate an aldehyde in an imagewise fashion to produce relief or transfer images by utilizing the hardening effect of aldehydes on gelatin and similar emulsion binders.

Illustrative of the aforementioned cyclic compounds particularly useful in forming dye images are those represented in the following formulae (V) and (VI), and preferably (VI).

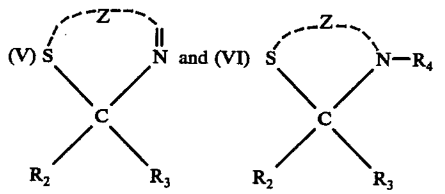

wherein $R_2$, $R_3$, $R_4$ and Z have the same meaning given above. It will be appreciated that the ring system represented by Z may be substituted if desired as in the illustrative compounds of formulae (I) to (IV). When using these compounds in the production of dye images, the color-providing moiety is preferably but not necessarily substituted on the carbon atom common to the sulfur and nitrogen atoms. If the color-providing moiety selected as the organic radical $R_2$ and/or $R_3$ is a diffusible dye then $R_4$ and/or a group or groups substituted on the ring Z should be capable of rendering the parent compound substantially immobile in the photographic processing solution. Alternatively, if the color-providing moiety is a non-diffusible dye, the $R_4$ and/or a group or groups substituted on Z should be capable of rendering the parent compound diffusible in the processing solution.

In the present invention, the parent compound may be present initially in the photosensitive element in a layer or layers other than the layer containing the light-sensitive silver halide emulsion. For example, it may be in a layer over the emulsion, in a layer between the support and the emulsion, or in two layers, one on either side of the emulsion. It may be present in the photosensitive layer itself if the compound is inert, that is photographically innocuous in that it does not adversely affect or impair image formation to any appreciable or unacceptable extent. If not photographically innocuous, the compound may be modified in a manner which does not interfere with the development process in any way, but which deactivates the compound so that it does not affect adversely the light-sensitive emulsion. Preferably, the parent compound is contained in a layer separate from the silver halide emulsion. If desired, it may be separated from the emulsion layer by one or more spacer layers, or it may be contained in a layer associated with the image-receiving layer in processes such as diffusion transfer where receiving elements are employed.

As mentioned previously, the processing compositions customarily employed in silver diffusion transfer processes comprise an aqueous alkaline solution of a silver halide solvent and a silver halide developing agent. The named ingredients may be present initially in the aqueous medium or may be present initially elsewhere in the photographic product, for example, in the emulsion and/or image-receiving and/or spacer layers as heretofore suggested in the art. When such ingredients are present initially in the film unit, the processing composition is formed by contacting the product with a suitable aqueous medium to form a solution containing these ingredients. Though the use of a silver halide solvent is preferred in the processes of the present invention, it is not essential since cleavage may be assisted by the silver ion contained in the unexposed portions of the emulsion.

The alkali employed in the processing composition may be any of the alkaline materials heretofore used, such as sodium or potassium hydroxide. The silver halide solvent also may be any of the heretofore known materials, such as, sodium or potassium thiosulfate, sodium thiocyanate and uracil. Also, a silver halide solvent precursor may be used, such as described in copending U.S. patent application Ser. No. 99,310 filed Dec. 17, 1970 and now U.S. Pat. No. 3,698,898 issued Oct. 17, 1972. The silver halide developing agent may be selected from those commonly employed such as the diamino benzenes, e.g., paraphenylenediamine; aminophenols, e.g., methyl-p-aminophenol; and dihydroxybenzenes, e.g., hydroquinone. In addition to the aforementioned ingredients, the composition may contain antifoggants, preservatives, viscosity-imparting reagents, and other adjuncts as conventionally used in the art. It will be understood that the selection of the above materials is not critical to the practice of this invention.

In the accompanying drawings, FIG. 1 illustrates the processing of a photosensitive element to prepare a color transfer image in accordance with one embodiment of the present invention. As shown therein, an exposed photosensitive element including a support 10, a layer of color-providing material 11 and a light-sensitive silver halide emulsion layer 12 is placed in superposition with a receiving element comprising an image-receiving layer, e.g., a dyeable stratum 13 and a support 14 therefor. A processing composition 15 is distributed between the two elements as they are brought into superposition. In exposed areas of emulsion layer 12, silver halide is reduced to image silver while an imagewise distribution of soluble silver complex is formed in terms of unexposed areas. This imagewise distribution is, at least in part, transferred by imbibition to layer 11 where it accelerates cleavage of the color-providing material to release a diffusible color-providing moiety, e.g., a dye, in areas corresponding to unexposed areas of emulsion layer 12. This, in turn, produces an imagewise distribution of the diffusible color-providing moiety, corresponding to unexposed areas of the emulsion layer, which is transferred to the receiving layer 13 to form a positive color transfer image.

Processing composition 15 may be applied to the emulsion layer by coating, dipping, spraying or any or all of the ingredients thereof may be confined intially in a frangible container such as disclosed in U.S. Pat. No. 2,543,181, the container being positioned in the film unit so as to be capable upon rupturing of spreading its contents in a substantially uniform layer between the superposed layers. It will be appreciated that the respective elements may be placed in superposition following impregnation with the processing composition according to procedures known in the art.

Figure 2:
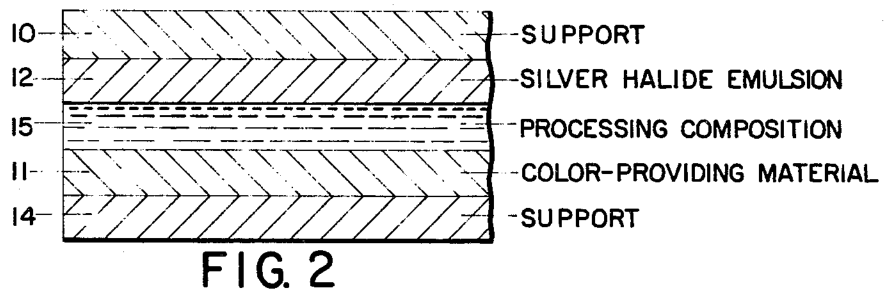
FIG. 2 is a similar view illustrating another aspect of the invention.

Negative color images also may be obtained by employing a film unit where the layer of cleavable color-providing compound is associated with the receiving element, such as illustrated in FIG. 2. As shown therein, an exposed silver halide emulsion 12 on a support 10 is processed by spreading a processing composition 15 between the emulsion layer and a layer of a colored color-providing material 11 on a support 14. In exposed areas of emulsion layer 12, silver halide is reduced to image silver, while an imagewise distribution of soluble silver complex is formed in terms of undeveloped areas of silver halide. This imagewise distribution is transferred, at least in part, by imbibition, to layer 11 where it accelerates cleavage of the cleavable color-providing compound to provide a diffusible color-providing moiety, e.g., dye, in areas corresponding to undeveloped areas of the emulsion layer. Diffusion of the diffusible color-providing moiety from the image-receiving element into the processing composition leaves a negative color image in layer 11.

The film structures shown in the Figures may be varied, for example, by employing one or more interlayers between those of the emulsion and cleavable parent compound as suggested above or by varying the order of the layers and is intended to be illustrative only of product structures useful in the preparation of color images according to the present invention.

The following examples are given to illustrate the present invention and are not intended to limit the scope thereof.

EXAMPLE I

A solution containing 0.4 cellulose acetate hydrogen phthalate; 10.0 cc. methanol; 2-methoxyethanol and 0.4 g. of color-providing compound,

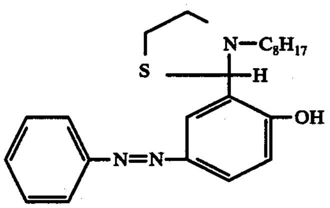

was dip coated on a cellulose acetate support at a rate of ten feet per minute. On top of the resulting layer was dip coated a solution containg 0.2 g. cellulose acetate hydrogen phthalate; 10.0 cc. methanol, and 10.0 cc. 2-methoxyethanol also at a rate of 10 feet per minute. Finally, a blue-sensitive silver iodobromide emulsion layer was applied which contained 100 mg. per square foot silver and 30 mg. per square foot gelatin.

To determine the difference in transfer of color-providing moiety obtained with a processing composition containing a silver halide solvent, e.g., sodium thiosulfate, and one without silver halide solvent, one portion of the photosensitive element prepared above was processed without exposure using the processing composition designated Solution A and the other portion processed without exposure using the processing composition designated Solution B.

| Ingredients | Solution A | Solution B |
|---|---|---|
| Water | 100.0 cc. | 100.0 cc. |
| Sodium hydroxide | 2.5 g. | 2.5 g. |
| Hydroxyethyl cellulose | 3.9 g. | 3.9 g. |
| Sodium thiosulfate | 2.0 g. | — |

Processing was carried out by spreading each solution in a layer 0.0016 inch thick between the photosensitive element and the receiving element containing a dyeable stratum that had been superposed therewith. The image-receiving elements used with the two portions of photosensitive material comprised a layer of a 2:1 mixture by weight, of polyvinyl alcohol and poly-4-vinyl pyridine over a layer of polyvinyl alcohol coated on a baryta paper support. After an imbibition period of about 30 seconds, each of the image-receiving and photosensitive elements were separated and the transfer densities measured. The resulting transfer densities for the units processed with Solution A and Solution B were 1.56 and 0.26, respectively. These results illustrated that substantially greater transfer of diffusible dye was obtained in the presence of soluble silver hypo complex.

EXAMPLE II

A further experiment was conducted to demonstrate the cleavage of the color-providing compound used in Example I. For this experiment, a photosensitive element was prepared in the same manner as in Example 1 above except that an interlayer comprising 100 mgs. per square foot of gelatin was provided between the gelatino silver iodobromide emulsion layer and the underlying layer of cellulose acetate hydrogen phthalate. The outer silver halide emulsion layer was then removed from the element with an enzyme solution after which the element was divided into three portions. Each of the three portions was superposed with an image-receiving element and treated with solutions C, D and E, respectively, by spreading solution between the superposed materials in a layer 0.0016 inch thick. The image-receiving element was prepared in the same manner as that in Example I above except that an additional layer of a half-butyl ester of poly-(ethylene/maleic anhydride) was provided between the layer of polyvinyl alcohol and the baryta support.

The solutions employed comprised the following:

| Ingredients | Solution C | Solution D | Solution E |
|---|---|---|---|
| Water | 100.0 cc. | 100.0 cc. | 100.0 cc. |
| Hydroxyethyl cellulose | 3.9 g. | 3.9 g. | 3.9 g. |
| Sodium Hydroxide | 5.0 g. | 5.0 g. | 5.0 g. |
| Sodium thiosulfate | — | 4.0 g. | 4.0 g. |
| Silver chloride | — | — | 0.7 g. |

After an imbibition time of 30 seconds, the superposed elements were separated and the transfer densities measured for each. The densities obtained were 0.15, 0.13 and 0.95 for the units treated with Solutions C, D and E, respectively. From these results it is readily apparent that the presence of silver ions as in the soluble silver hypo complex is necessary for cleavage to liberate the color-providing moiety in imageforming quantities in reasonable process times.

EXAMPLE III

A photosensitive element was prepared by coating a cellulose acetate support with 186 mgs. per square foot of the color-providing compound used in Example I above. On top of the layer of compound there was applied a layer containing 100 mgs. per square foot gelatin, and finally there was applied a blue-sensitive layer of silver iodobromide emulsion containing 33 mgs. per square foot of silver and 30 mgs. per square foot of gelatin. This element was exposed for one one-hundredth of a second to blue light through a density step tablet. Thereafter, the exposed element was superposed with an image-receiving element and a 0.0016 inch layer of processing composition was spread therebetween. The image-receiving element was the same as that used in Example II. The processing composition comprised the following:

| | |
|---|---|
| Water | 100.0 cc. |

-continued

| | |
|---|---|
| Hydroxyethyl cellulose | 3.9 g. |
| Sodium hydroxide | 5.0 g. |
| p-Methylamino-phenol | 1.6 g. |
| Sodium sulfite | 2.0 g. |
| Sodium thiosulfate | 2.0 g. |
| 4-Amino-2-methyl-6-methoxy-phenol | 0.5 g. |

After an imbibition period of about 30 seconds, a positive yellow image was obtained which had a $D_{max}$ of 2.75 and a $D_{min}$ of 0.92 as measured at 400 m$\mu$.

EXAMPLE IV

Malononitrile and 2-(p-dimethyl-aminophenyl)-3-propylthiazolidine,

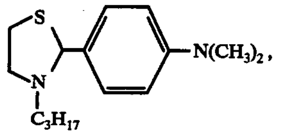

were dissolved in N-ethyldodecanamide and dispersed in gelatin. The resulting dispersion was coated on a transparent base comprising cellulose triacetate. A photosensitive element comprising a gelatino silver iodobromide emulsion carried on a paper base was totally fogged and one-half was then developed for ten minutes in a mixture of hydroquinone and methyl p-aminophenol, stopped with dilute acetic acid, rinsed and dried. Thereafter, the dried photosensitive element was superposed with the coated sheet prepared above and a 0.034 layer of processing composition was spread therebetween. The processing composition comprised the following:

| | |
|---|---|
| Water | 100.0 cc. |
| Hydroxyethyl | 3.4 g. |
| Sodium hydroxide | 5.0 g. |
| Titanium dioxide | 50.0 g. |
| Potassium thiocyanate | 4.0 g. |

Almost instantaneously, a yellow image was produced in the area of the coated sheet corresponding to the undeveloped portion of the photosensitive element by the following sequence:

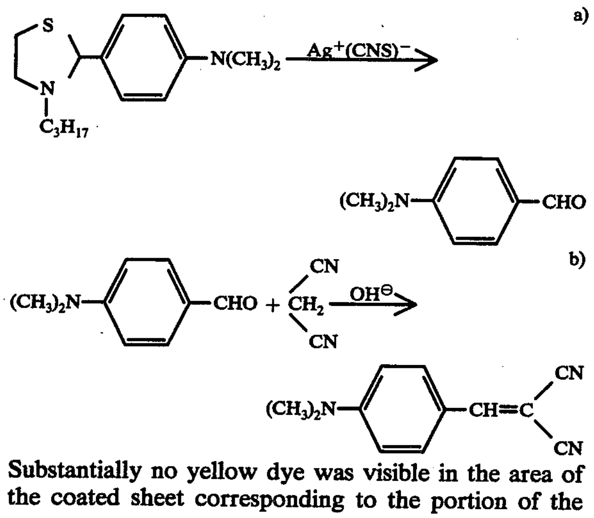

Substantially no yellow dye was visible in the area of the coated sheet corresponding to the portion of the photosensitive element where silver had been developed.

It will be appreciated that dye images may be prepared in accordance with Example IV above using different color-forming reagents, e.g., different methylene couplers and different dye intermediates, e.g., different aldehydes.

As disclosed in aforementioned copending U.S. Pat. Application Ser. No. 155,000, dye images may be produced by the reaction of an aldehyde or a ketone with a color-forming reagent, e.g., a methylene coupler. In one embodiment cyclic sulfur-nitrogen compounds containing the group —S—X—N= or preferably

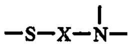

as part of the ring may be used to release one or both of these reagents in an imagewise distribution, which reagents upon subsequent reaction produce a corresponding imagewise distribution of a complete dye. Typical cyclic sulfur-nitrogen compounds are illustrated in the following formulae:

a) 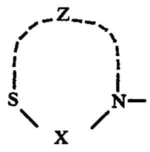 and b) 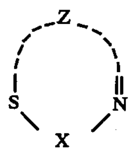

wherein Z represents the atoms, preferably carbon atoms necessary to complete a ring-system containing at least 4 members and usually containing up to about 20 members and X has the same meaning given above and preferably is

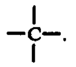

As the color-forming reagent, any compound may be used that will react with aldehydes and/or ketones to give a colored product. Suitable compounds include methylene couplers and those reagents used in color tests for identifying aldehydes and ketones as reported in the literature. The term "methylene coupler" as used herein is intended to include compounds containing an active methylene group and also compounds containing a reactive methyl group capable of forming a methylene base in alkaline media. Typical of compounds possessing a reactive methyl group are quaternary ammonium compounds, such as, pyridinium quaternary ammonium compounds having a methyl substituent in the 2 and 4 positions of the heterocyclic ring. Examples of 2 and 4 methyl-substituted pyridinium compounds are those wherein the nitrogen atom is substituted by groups, such as, alkyl, e.g., methyl, ethyl and propyl; aryl, e.g., phenyl; and aralkyl, e.g., phenethyl and benzyl. These compounds may be used as the free base or a salt where the anion is a derivative of any acid, e.g., a tosylate.

The couplers containing an active methylene group may be characterized as compounds containing a methylene (—$CH_2$—) group bonded directly to at least one activating group, such as, a keto, aldehyde, ester or nitrile group and usually a carbonyl or nitrile group.

The methylene group also may be bonded to two such activating groups, the same or different, and the methylene group may be part of an open chain structure or a member of a ring system.

These compounds containing at least one active methylene group are generally known in the photographic art as useful couplers with color developing agents, e.g., the p-phenylene diamine series, to form a dye, as discussed in Mees, The Theory of the Photographic Process, revised edition, 1966, pp. 382–395. Any of the methylene couplers commonly used for this purpose may be employed in the present invention such as the acylacetic esters; acylacetoacetic esters; malonic acid esters; actonitriles; acylacetonitriles, aroylacetonitriles; cyanacetic esters, cyanacetophenones; cyanacetyl coumarones; cyanacetyl hydrazones; acetoacetamides; cyanoacetamides, 1,3-indandiones; thionindoxyls; oxindoles; indazoline-3-ones; isoxazole-5-ones; pyrimidazolones; and homophthalimides. The coupler employed preferably is colorless, through it may be colored depending upon its location in the photographic element.

Rather than being coated on the transparent receiving element, the layer of color-providing compound and coupler may be associated with the emulsion layer in the photosensitive element, e.g., to yield a dye capable of diffusing in the processing composition to form a transfer image. By using a transparent receiving element, the resulting image, when stripped from the photosensitive element, may be viewed by transmitted light as a transparency. If the photosensitive element and/or processing composition contains a translucent layer of a material providing the requisite background, e.g., a white pigment such as titanium dioxide, the image may be viewed as a reflection print without separating the image-receiving and photosensitive elements. Color transparencies and reflection prints of this type also may be produced in this manner where the diffusible color-providing moiety released is a complete dye. In the various embodiments of the present invention, other silver halide emulsions may be used, such as silver chloride, silver bromide, silver bromoiodide, silver chlorobromide and silver chlorobromoiodide. Rather than the conventional silver halide emulsions, direct positive silver halide emulsions may be employed. By using such an emulsion in Example 4 above, for instance, a negative rather than a positive transfer image may be produced. Typical materials that may be used as the support for the emulsion are paper, glass and plastic materials, e.g., cellulose nitrate, cellulose acetate, polyvinyl acetal, polystyrene, polyethyleneterephthalate, polyethylene and polypropylene.

While in the foregoing, reference is made to the preparation of a monochromatic image, it will be appreciated that the invention is applicable to the formation of multicolor images. For example, the above-described color-providing compounds may be employed in photographic systems utilizing integral multilayer photosensitive elements comprising at least two selectively sensitized silver halide emulsion strata with associated color-providing material which are processed simultaneously and without separation to provide a multicolor image on a single common image-receiving element. In such a structure, there is preferably used a barrier interlayer of silver complex scavenger, e.g., siler precipitant, to confine diffusion of soluble silver complex to the appropriate thiazolidine stratum. Another useful structure for obtaining multicolor images is the screen type negative described in U.S. Pat. No. 2,968,554 issued Jan. 17, 1961 to Edwin H. Land or that described in U.S. Pat. No. 3,019,124 issued Jan. 30, 1962 to Howard G. Rogers.

The expression "color" as used throughout the foregoing specification and in the appended claims is intended to include the use of a plurality of colors to obtain black.

As discussed above, rather than liberating a color-providing moiety as the reagent, the system of the present invention may be used to form an imagewise distribution of another reagent, preferably a photographically active reagent, in the same manner as color images were formed in the foregoing examples. The parent compound, such as the compounds illustrated in equations (1) to (8) above may be appropriately substituted to yield the desired photographic reagent upon cleavage in the presence of silver ions, or the unsubstituted compound itself may be used to provide the photographic reagent desired.

As in the formation of color images, the compouonds found especially useful in diffusion transfer processes for releasing various photographic reagents are those containing the group

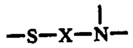

or — S — X — N = and especially

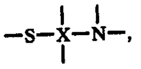

particularly where X is

Such compounds, as exemplified by thiazolidine, may be employed in aqueous media in the presence of silver ion, to liberate, for example:

(a) a silver halide solvent

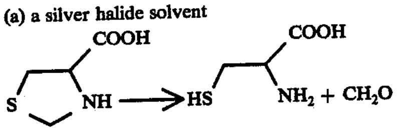

(b) a gelatin hardener

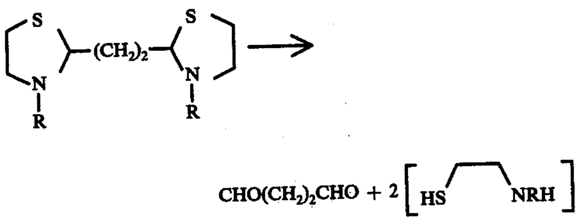

(c) an antifoggant

-continued (i)

(ii)

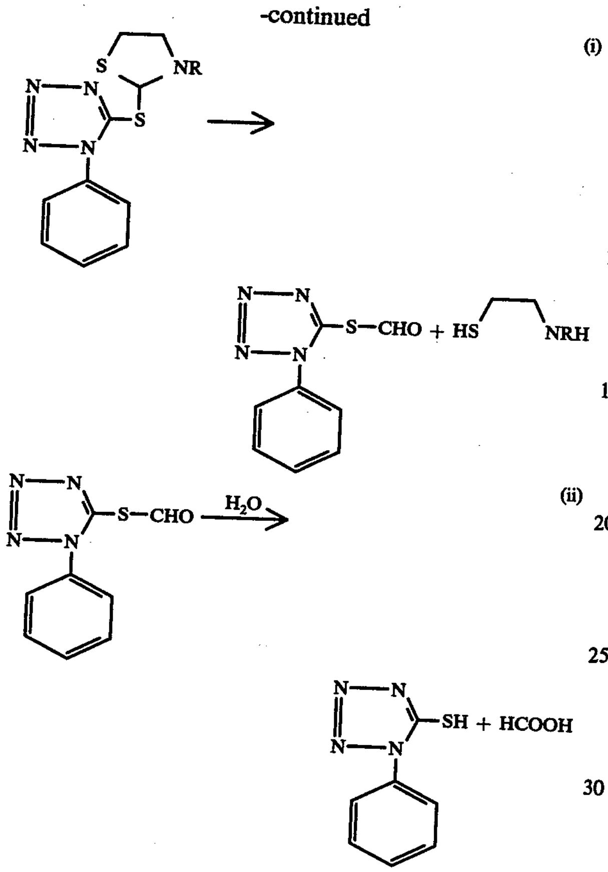

Thiazolidine itself upon cleavage, as illustrated in equation (8) above, yields a fragment containing a mercapto group which fragment finds use as a development restrainer or antifoggant. This compound also may be used to produce a secondary amine or a tertiary amine, depending upon the N-substituent, and as illustrated above, may be used to produce an aldehyde, or where the hydrogen on the common carbon atom is replaced by phenyl or other substituent, to liberate a ketone. Releasing an imagewise distribution of active reagent in this manner affords many advantages. For example, relief images may be prepared by liberating a gelatin hardener in the unexposed areas, and as noted previously, fogging may be controlled more effectively by releasing the antifoggant in an imagewise fashion during processing.

It will be appreciated that the photographic system of the present invention may be used to liberate reagents other than those specifically mentioned and that the present system for releasing a reagent in an imagewise fashion may be used with film structues other than those illustrated. For example, in diffusion transfer film units the negative component comprising at least one light-sensitive layer and the positive component comprising an image-receiving layer may be separate elements as shown above which are brought together during processing and thereafter either retained together as the final print or separated following image formation.

Rather than the photosensitive layer and the image-receiving layer being in separate elements, they may be in the same element. In such a film unit, the image-receiving layer is coated on a support and the photosensitive layer is coated on the upper surface of the image-receiving layer. The liquid processing composition is applied between the combined negative-positive element and a spreading sheet which assists in spreading the liquid composition in a uniform layer adjacent the surface of the photosensitive layer.

Illustrative of still other film units are those where the negative and positive components together may comprise a unitary structure, e.g., integral negative-positive film units wherein the negative and positive components are laminated and/or otherwise physically retained together at least prior to image formation. Generally, such film units comprise a plurality of essential layers including a negative component comprising at least one light-sensitive layer, e.g., a silver halide layer and a positive component comprising an image-receiving layer which components may be laminated together or otherwise secured together in physical juxtaposition as a single structure. In the formation of color transfer images, the dye image-providing compounds of the present invention may be associated with the silver halide layer or layers of the negative component.

Included among such structures are those adapted for forming a transfer image viewable without separation, i.e. wherein the positive component containing the transfer image need not be separated from the negative component for viewing purposes. In addition to the aforementioned essential layers, such film units include means for providing a reflecting layer between the image-receiving and negative components in order to mask effectively the silver image or images formed as a function of development of the silver halide layer or layers and any remaining associated dye image-providing material and also to provide a background for viewing the transfer image in the receiving component, without separation, by reflected light. This reflecting layer may comprise a preformed layer of a reflecting agent included in the essential layers of the film unit or the reflecting agent may be provided subsequent to photoexposure, e.g. by including the reflecting agent in the processing composition.

These essential layers are preferably contained on a transparent support closest to the image-receiving layer and preferably include another support positioned on the opposed surface of the essential layers so that the layers are sandwiched or confined between the support members, at least one of which is transparent to permit viewing of the final image. Such film units usually are employed in conjunction with means, such as, a rupturable container containing the requisite processing composition and adapted upon application of pressure of applying its contents to develop the exposed film unit.

Among the color-providing compounds discussed above, those compounds comprising a complete dye, i.e., a dye radical comprising the chromophoric system of a dye and a cyclic moiety containing the group

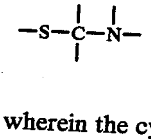

included in the ring wherein the cyclic moiety is capable of undergoing cleavage in the presence of silver ions are novel compounds. These compounds may comprise one or more dye radicals and one or more of the above-denoted 1,3-sulfur-nitrogen moieties. For example, they may comprise one dye radical and one cyclic moiety or two or more cyclic moieties for each dye radical and vice versa. The dye radical may be derived from any of the various classes of dyes known in the art. The cyclic moiety may be derived from any cyclic 1,3-sulfur-nitrogen compound containing at least four members in the ring system and containing the aforementioned group as part of the ring, the cyclic compound being capable of undergoing cleavage in the presence of ionic silver.

As discussed above, the dye may be linked directly to an atom of the cyclic 1,3-sulfur-nitrogen ring system by a valence or ionic bond or through a spiro union, or the dye may be linked indirectly to the ring system through an appropriate linking group either cyclic or acyclic or a combination. Preferably, the dye is substituted in the 2-position of the ring-system, i.e., on the carbon atom common to the sulfur and nitrogen atoms. The novel dyes may be diffusible or non-diffusible in alkaline processing solution and if non-diffusible, may contain a bulky group linked directly or indirectly to the molecule, usually on the cyclic portion. Likewise, the novel dyes may contain solubilizing groups to adjust the solubility characteristics, as may be desired.

The novel compounds of the present invention comprise a dye containing from 1 to 4 and preferably 1 or 2 $[(L)_{m-1}-Y]$ groups and may be represented by the formula $$D-[(L)_{m-1}-Y]_n \quad (A)$$

wherein D represents a dye radical, i.e., the radical of an organic dye possessing at least one carbon atom, L is a divalent organic linking group containing at least one carbon atom, *m* is a positive integer 1 or 2, *n* is a positive integer from 1 to 4, and Y is a cyclic moiety selected from (a)

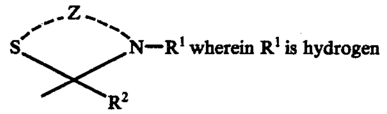

or a monovalent organic radical; $R^2$, when n is 1, is hydrogen, a monovalent hydrocarbon radical or the group $-(L)_{m-1}-D$ wherein L, m and D have the same meaning given above and $R^2$, when n is greater than 1, is hydrogen or a monovalent hydrocarbon radical; and Z represents the atoms, preferably carbon atoms necessary to complete a ring system having 4 to 20 atoms, said cyclic moiety (a) being attached to the carbon atom of said dye radical D by a single covalent bond when *m* is 1 and attached to the carbon atom of said linking group L by a single covalent bond when *m* is 2 and (b)

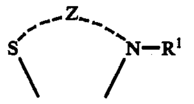

wherein $R^1$ and Z have the same meaning given above, said cyclic moiety (b) being attached to the carbon atom of said dye D by a spiro union when m is 1 and attached to the carbon atom of said linking group KL by a spiro union when m is 2 and said cyclic moieties (a) and (b) being capable of undergoing cleavage in the presence of silver ions and/or soluble silver complex.

As noted above, the dye used to provide the dye radical, D, may be selected from any of the classes of dyes heretofore known in the art and encompasses all types of dye structures including metal complexed or metal complexable dyes and dyes which change from one color to another or from colorless to a color or vice-versa, such as, pH-sensitive indicator dyes, leuco dyes and "temporarily color-shifted dyes". The choice of dye is primarily limited by the spectral characteristics which it is desired to have in the dye product comprising the dye radical and cyclic 1,3-sulfur-nitrogen moiety. For use in photographic processes, it will be appreciated that the dye selected to provide the dye radical preferably should not possess constituents which are harmful to photographic materials, such as silver halide, or when possessing such constituents, should be suitably modified to prevent adverse effects on the photographic emulsion. Where the mobility and/or solubility of the dye is not satisfactory, it usually may be modified by the addition or removal of solubilizing substituents, e.g., carboxy, hydroxy, sulfo or amino and/or immobilizing substituents, e.g., hydrocarbon groups, such as, long chain alkyl. Rather than placing such substituents on the dye radical, D, they may be substituted on the linking group L, in those compounds where a linking group is employed to unite the dye radical and the cyclic 1,3-sulfur-nitrogen moiety.

Examples of dyes that may be used to provide the dye radical, D, include nitro, indophenol, indoaniline, thiazole, cyanine, di- and triphenylmethane, anthrapyridone and particularly, azo, anthraquinone, azomethine, phthalocyanine and metal-complexed azo, azomethine and phthalocyanine dyes. Specific radicals of organic dyes that may comprise D in the compounds of the present invention include the dye radicals comprising the dye portion of the dye developers disclosed in U.S. Pat. Nos. 3,076,808; 3,076,820; 3,134,762; 3,134,763; 3,134,764, 1,134,765; 3,135,734; 3,173,906; 3,186,982; 3,201,384; 3,208,991; 3,209,016; 3,218,312; 3,236,864; 3,236,865; 3,246,016; 3,252,969; 3,253,001; 3,255,206; 3,262,924; 3,275,617; 3,282,913;, 3,288,778; 3,299,041; 3,303,183, 3,306,891; 3,337,524; 3,337,589, 3,357,969; 3,365,441; 3,424,742; 3,482,972; 3,491,127; 3,544,545; 3,551,406; 3,597,200 and 3,752,836.

The cyclic 1,3-sulfur-nitrogen moiety, Y, may be derived from the cyclic compounds illustrated in the formula below:

a)

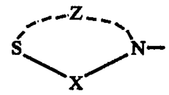

where Z represents the atoms, preferably carbon atoms, necessary to complete a ring-system containing at least 4 members and usually containing up to 20 members and X is

i.e., a carbon atom possessing 4 single covalent bonds in tetrahedral fashion. The cyclic moiety may be directly attached to the dye radical, or it may be indirectly attached to the dye radical by a linking group. To release the dye radical or the dye radical plus linking group as an aldehyde or ketone, the cyclic moiety should be attached a carbon atom of the dye radical, preferably a ring carbon of the chromophoric system comprising the dye, i.e., a nuclear carbon atom of the radical of the organic dye, D, and when a linking group is present, it should be attached to a carbon atom of the linking group. The cyclic sulfur-nitrogen moiety may be attached to the carbon atom of the dye or to the carbon atom of the linking group by a single covalent bond or by a spiro union, and preferably, the cyclic moiety comprises a thiazolidine or a benzothiazoline moiety. Particularly preferred are the cyclic moieties set out in the following formulae:

(i) 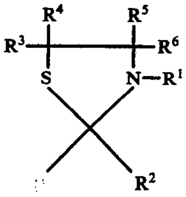 (ii) 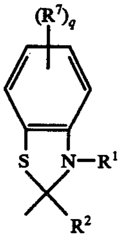

(iii) 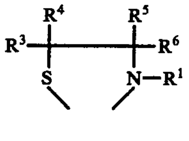 (iv) 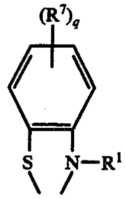

wherein $R^1$ and $R^2$ have the same meaning given in formula A; $R^3$, $R^4$ and $R^5$ each are hydrogen or alkyl having 1 to 20 carbon atoms and $R^4$ *and* $R^5$ taken together are $-(CH_2)_4-$; $R^6$ is hydrogen, carboxy, sulfo or alkyl containing 1 to 20 carbon atoms; $R^7$ is hydrogen, carboxy, sulfo, halo, such as, chloro and bromo, or alkyl containing 1 to 20 carbon atoms; and q is an integer 1 to 4. Preferably $R^3$ and $R^6$ are hydrogen when $R^4$ and $R^5$ together are $-(CH_2)_4-$.

Preferably, the monovalent organic radical comprising $R^1$ is selected from alkyl containing 1 to 20 carbon atoms, unsubstituted or substituted with —OH, $—SO_3H$, $—COOR^8$, $—SO_2NHR^8$, $—NHCOR^9$; alkoxy containing 1 to 20 carbon atoms; —N,N— dialkylamino wherein said alkyl groups contain 1 to 20 carbon atoms; phenyl, unsubstituted or substituted with —OH, $—SO_3H$, $—COOR^8$, $—SO_2NHR^8$, alkoxy having 1 to 20 carbon atoms, —N,N—dialkylamino wherein the alkyl groups contain 1 to 20 carbon atoms, alkyl containing 1 to 20 carbon atoms and alkenyl containing 1 to 20 carbon atoms; $—COR^9$; and $CONHR^9$, said $R^8$ being hydrogen or alkyl containing 1 to 20 carbon atoms and said $R^9$ being alkyl containing 1 to 20 carbon atoms. Preferably, the monovalent organic radical comprising $R^2$ is alkyl containing 1 to 20 carbon atoms, phenyl and phenyl substituted with alkyl containing up to 20 carbon atoms, particularly p-alkylphenyl.

The linking group may be any divalent organic radical possessing a carbon atom for attachment to the cyclic 1,3-sulfur-nitrogen moiety either by a single covalent bond or by a spiro union. Linking groups are well-known in the photographic art, and as discussed in U.S. Pat. Nos. 2,983,606 and 3,255,001, they are used to unite a dye radical of a desired, predetermined color with a group possessing a silver halide developing function to obtain a dye developer. Ordinarily, the linking group functions as an insulating linkage to prevent or interrupt any system of conjugation or resonance extending from the dye radical comprising the chromophoric system of a dye to the developer group. The linking groups used in the dye developer art, either insulating or non-insulating, are also useful in the present invention for uniting the dye radical with the cyclic sulfur-nitrogen moiety, and divalent organic radicals appropriate for use in the present invention may be selected from those disclosed in U.S. Patent No. 3,255,001 and those disclosed in the patents referred to above as showing useful dye radicals.

Preferably, the linking groups used in the subject dye compounds to connect the radical of the organic dye, D, to the cyclic moiety, Y, comprise a divalent hydrocarbon residue, e.g., alkylene, arylene or cycloalkylene together with sulfonamido or carboxamido, particularly the following:

(v)  and (vi) $D—(A')_{p-1}—E—A—Y$ wherein A and A' each are selected from alkylene containing 1 to 6 carbon atoms, phenylene, cyclohexylene and combinations thereof, B is alkylsulfonamido or alkylcarboxamido wherein said alkyl groups contain 1 to 6 carbon atoms, e.g., methylsulfonamido and methylcarboxamido, E is selected from —CONH—, $—SO_2NH—$, —NHCO— and $—NHSO_2—$ and $p$ is a positive integer 1 or 2. A and A' preferably are substituted with a solubilizing substituent selected from hydroxy, amino, carboxy and sulfo, i.e.,

 and 

wherein G and G' each is hydrogen or a solubilizing group, and preferably, A and A' each is alkylene containing 1 to 6 carbon atoms, phenylene

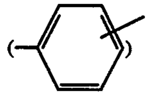

and combinations thereof, e.g.,

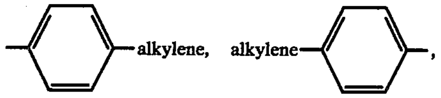

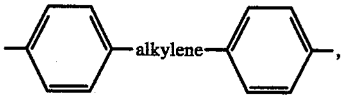

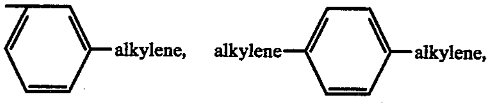

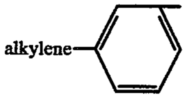 and 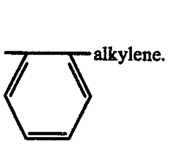

Specific linking groups of the types denoted above are as follows:

$D—SO_2NH—CH_2—Y$
$D—CONH—CH_2—Y$

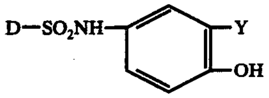

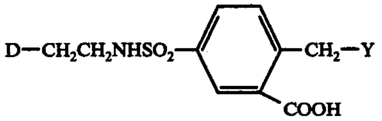

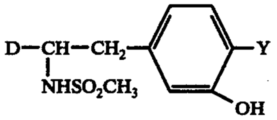

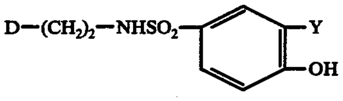

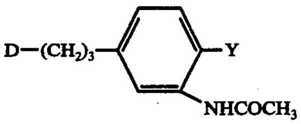

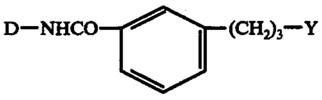

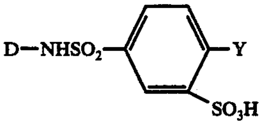

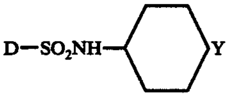

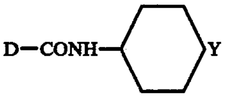

In a preferred embodiment, the novel compounds of the present invention comprise certain photographic color image-forming dyes characterized in that the dye contains from 1 to 4 and preferably 1 or 2 -$[(L')_{m-1}$-$Y']$ groups, as represented in the formula below:

$$D'\text{-}[(L')_{m-1}\text{-}Y']_n \qquad (B)$$

wherein D' represents the radical of an organic dye particularly, a dye radical comprising the chromophoric system of an azo, azomethine, anthraquinone, phthalocyanine, metal-complexed azo, metal-complexed azomethine or metal-complexed phthalocyanine dye; $m$ is a positive integer 1 or 2; $n$ is a positive integer from 1 to 4; L' represents a divalent organic linking group selected from

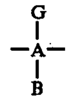

and 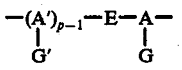

wherein A and A' each are selected from alkylene containing 1 to 6 carbon atoms, phenylene and combinations of alkylene and phenylene; B is selected from alkylsulfonamido and alkylcarboxamido wherein said alkyl groups contain 1 to 6 carbon atoms; E is selected from —CONH—, $—SO_2NH—$, —NHCO— and $—NHSO_2—$; G and G' each is hydrogen or a group selected from amino, hydroxy, carboxy and sulfo; $p$ is a positive integer 1 or 2; and Y' is a cyclic moiety capable of undergoing cleavage in the presence of silver ion and/or soluble silver complex selected from (i) 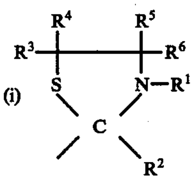 and (ii) 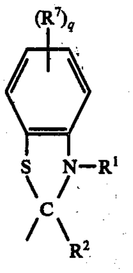

wherein $R^1$ is hydrogen or a monovalent organic radical; $R^2$ is hydrogen or a monovalent hydrocarbon radical; $R^3$, $R^4$ and $R^5$ each are hydrogen or alkyl containing 1 to 20 carbon atoms and $R^4$ and $R^5$ taken together are $(CH_2)_4$; $R^6$ is hydrogen, carboxy, sulfo or alkyl containing 1 to 20 carbon atoms; and $R^7$ is hydrogen, carboxy, sulfo, halo or alkyl containing 1 to 20 carbon atoms; and q is 1 to 4, said cyclic moiety being attached to a carbon atom of said dye radical by a single covalent bond when $m$ is 1 and being attached to a carbon atom of said A of said divalent organic linking group by a single covalent bond when m is 2 and said C atom common to said S and N atoms being a tetrahedral carbon atom possessing 4 single covalent bonds.

Specific examples of novel dye compounds within the scope of the present invention are set out below. It will be appreciated that the compounds which release the dye or dye plus linking group as an aldehyde contain a hydrogen substituted on the tetrahedral carbon atom common to the sulfur and nitrogen atoms of the cyclic sulfur-nitrogen moiety, e.g.,

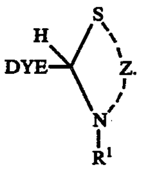

-continued
(1)
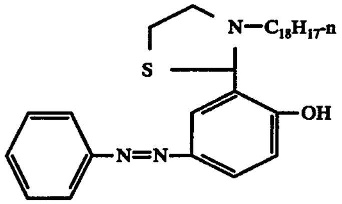
(2)
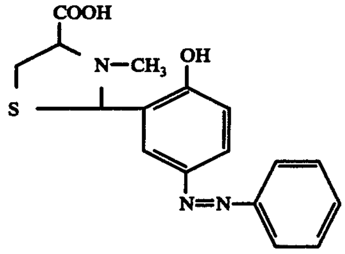
(3)
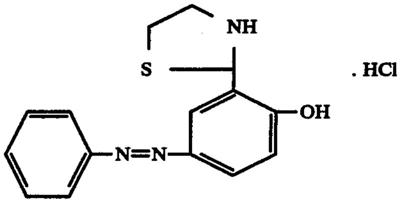
(4)
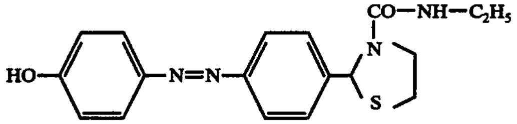
(5)
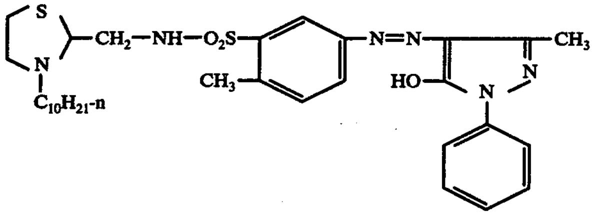
(6)
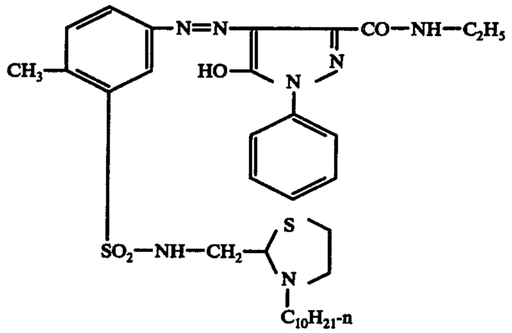
(7)
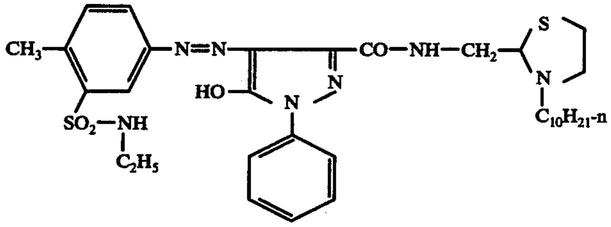
(8)
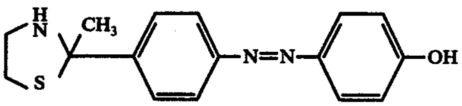

-continued
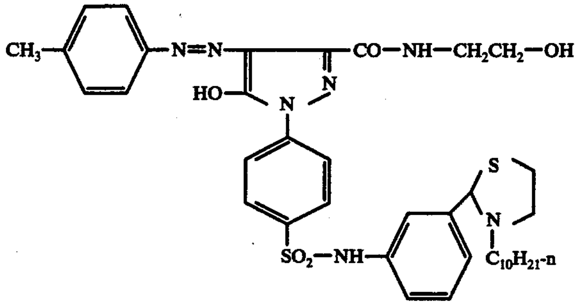
(9)
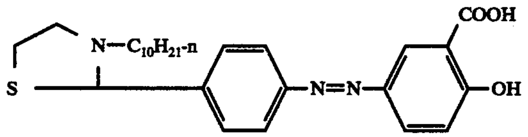
(10)
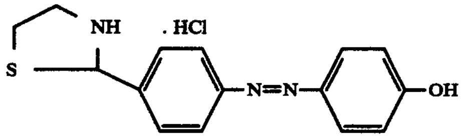
(11)
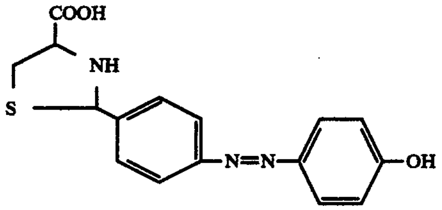
(12)
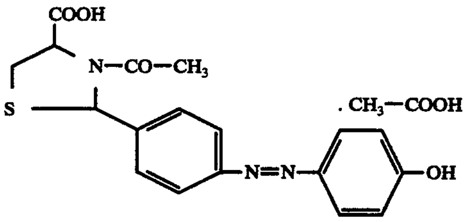
(13)
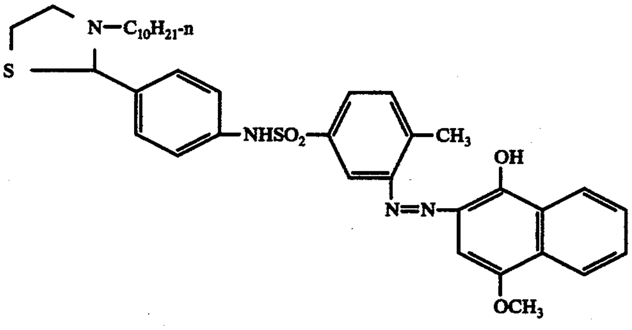
(14)
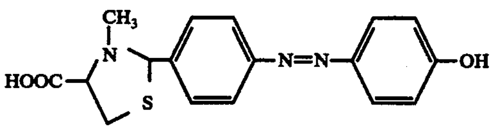
(15)
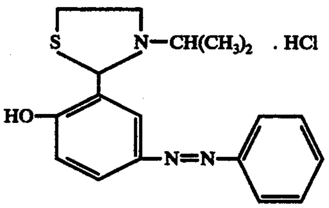
(16)

-continued
(17)
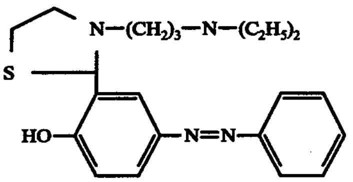
(18)
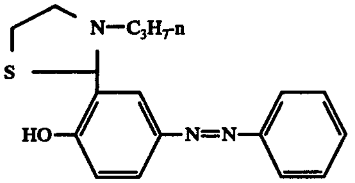
(19)
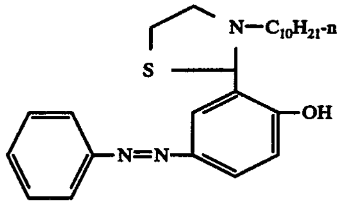
(20)
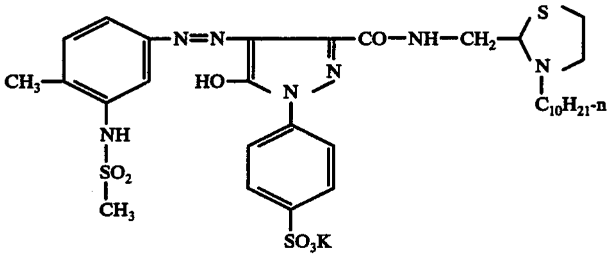
(21)
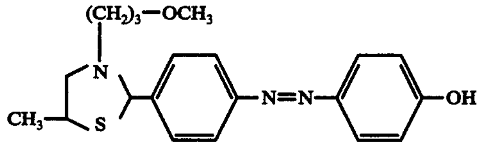
(22)
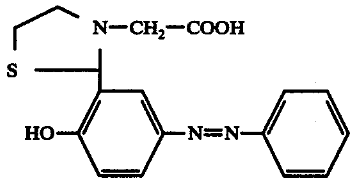
(23)
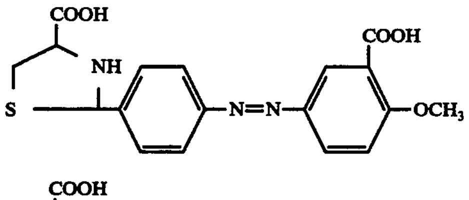
(24)
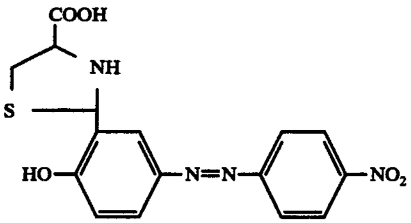

-continued
(25)
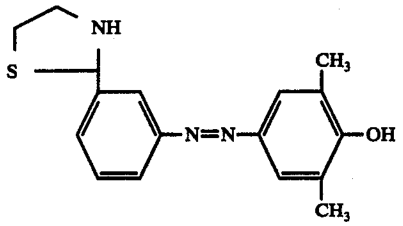
(26)
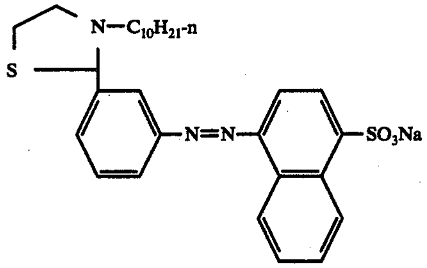
(27)
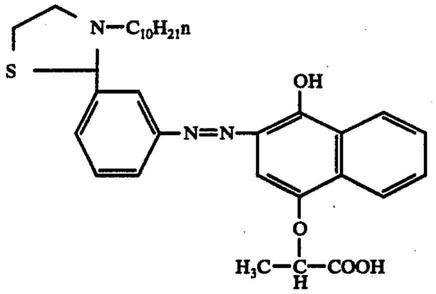
(28)
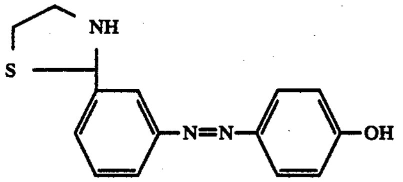
(29)
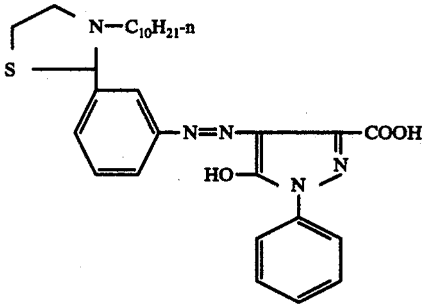
(30)
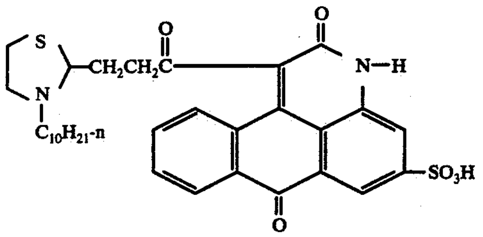
(31)
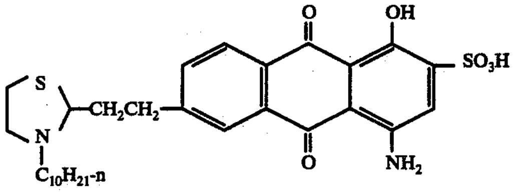

-continued
(32)
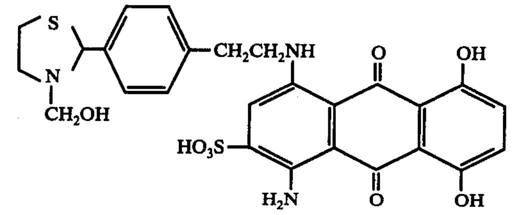
(33)
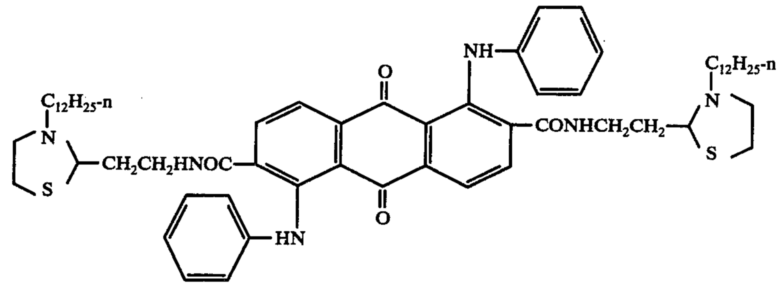
(34)
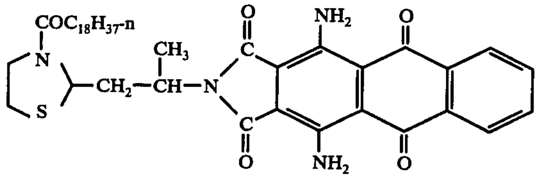
(35)
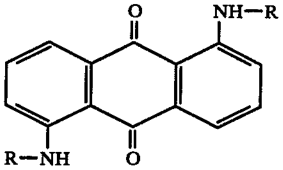
R is 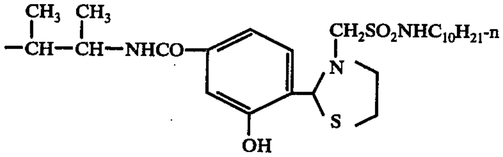
(36)
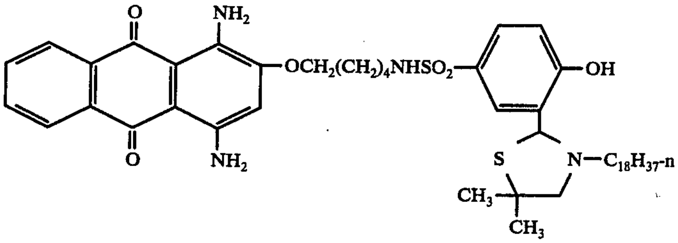
(37)
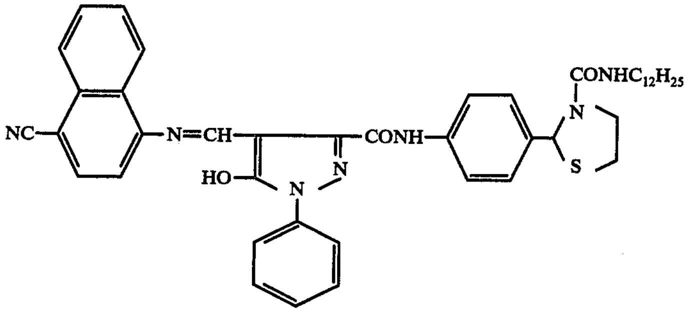

-continued
(38)
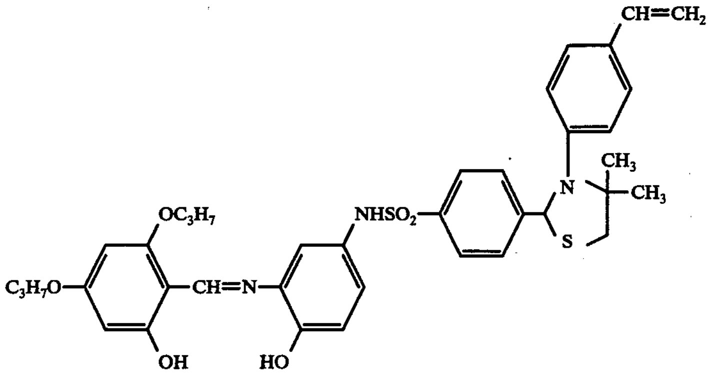
(39)
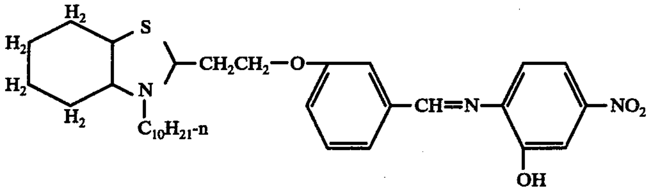
(40)
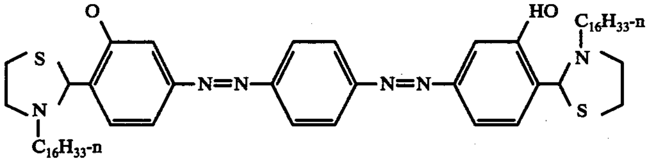
(41)
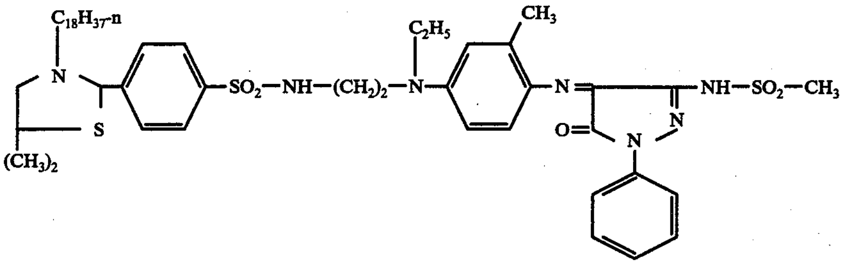
(42)
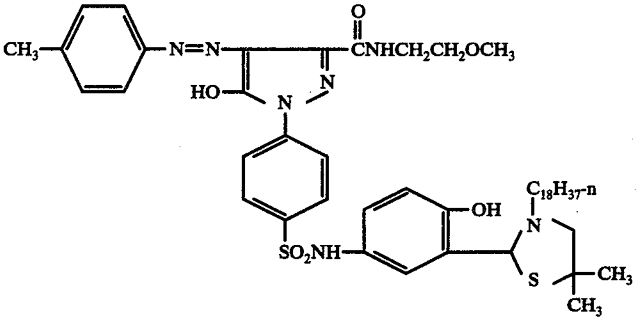
(43)
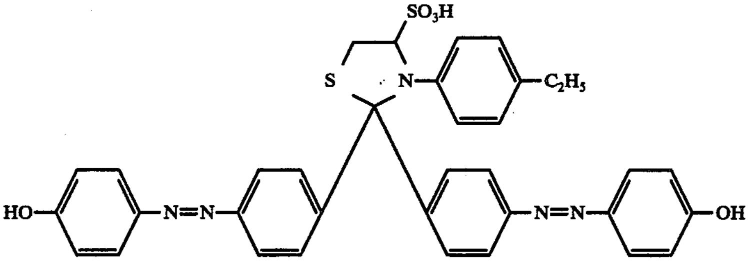
(44)
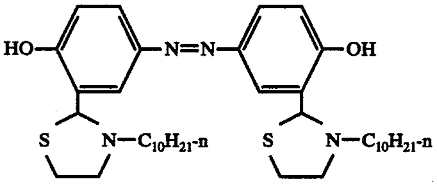

-continued
(45)
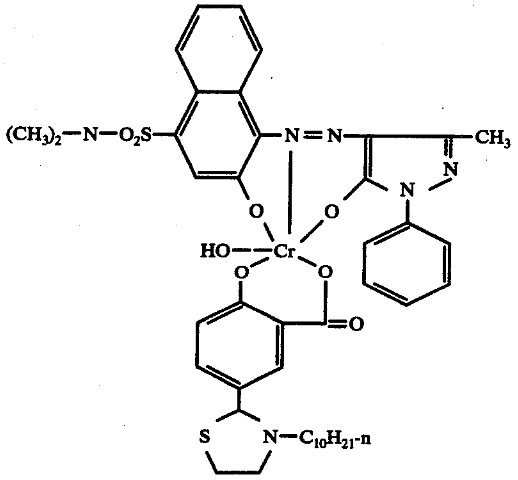
(46)
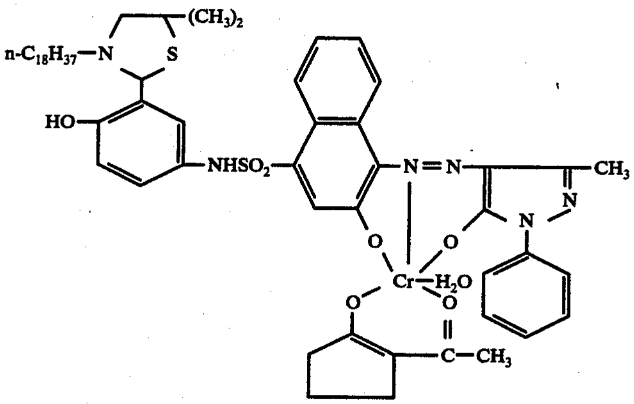
(47)
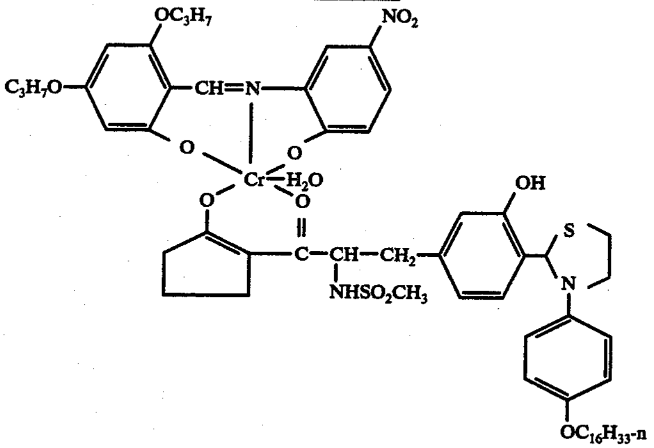
(48)
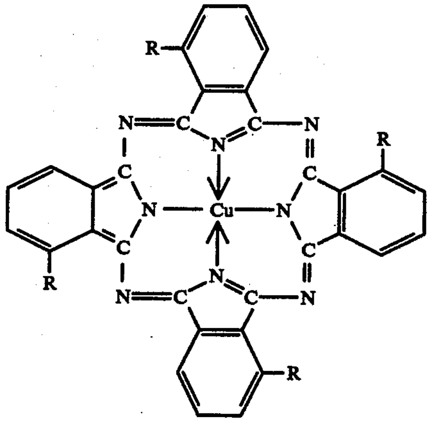

-continued
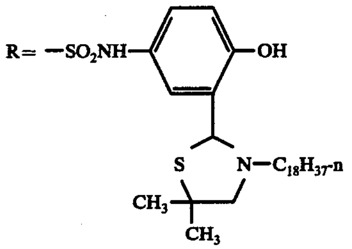
(49)
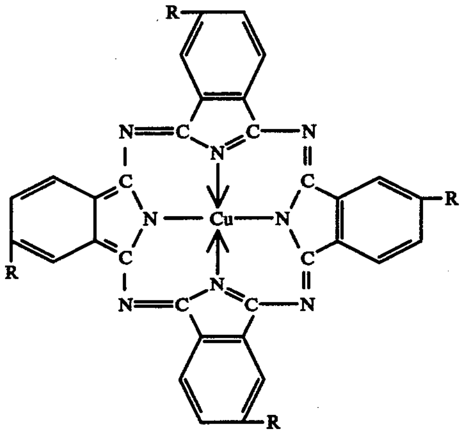
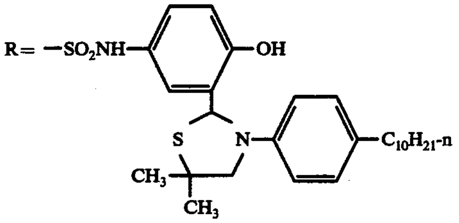
(50)
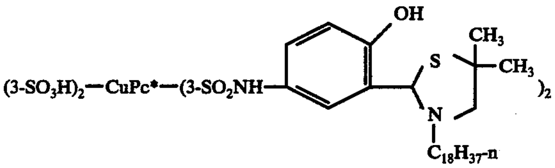
*CuPc = copper phthalocyanine
(51)
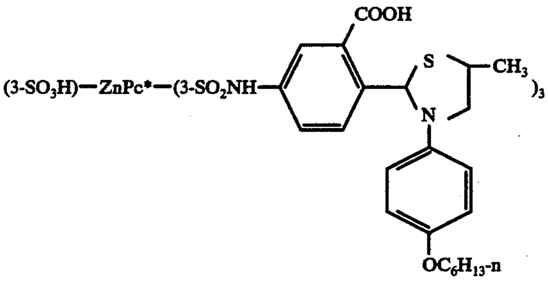
*ZnPc = zinc phthalocyanine
(52)
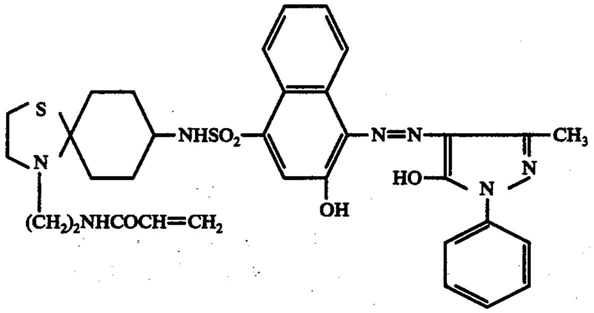

-continued

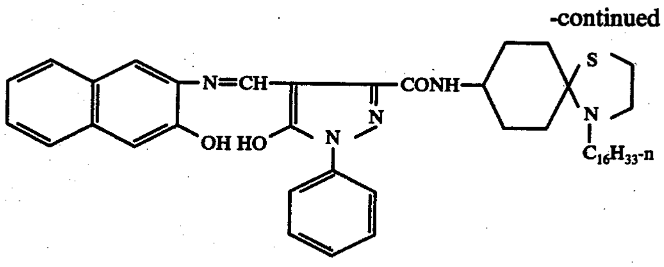

(53)

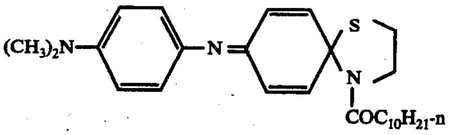

(54)

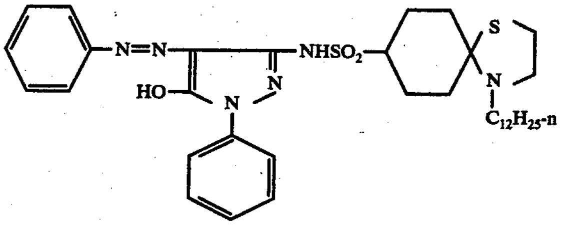

(55)

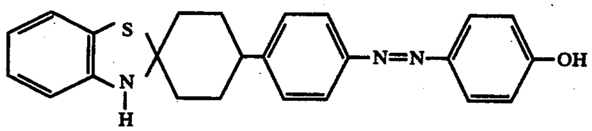

(56)

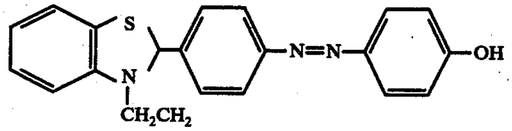

(57)

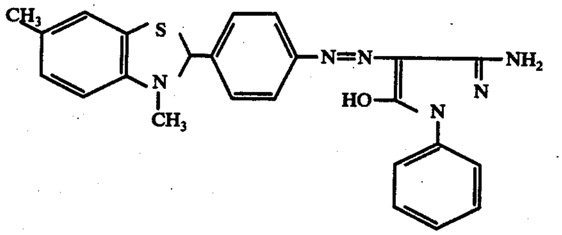

(58)

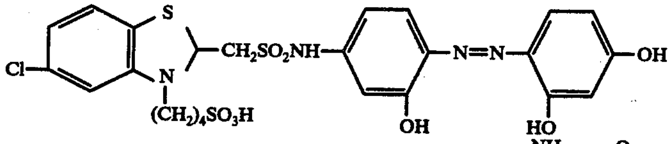

(59)

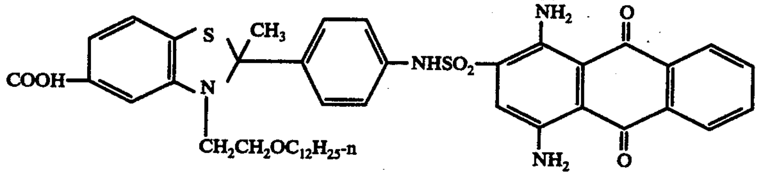

(60)

The novel dyes may be synthesized in a known manner by condensing an aldehyde, for example, a dye-substituted aldehyde, such as, DYE-CHO with a compound SH-Z-NHR[1] wherein Z represents the atoms, preferably carbon atoms to complete a cyclic 1,3-sulfur-nitrogen moiety having up to about 20 members in the ring system and $R^1$ is hydrogen or a monovalent organic radical. For example, the novel dyes may be prepared by condensing an aldehyde,

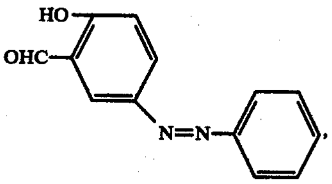

with 2-amino-ethanethiol or with ortho-amino-thiophenol to yield, for example, an azo dye possessing a cyclic moiety comprising a thiazolidine or a benzothiazoline moiety. It will be appreciated that a dye-substituted ketone may be substituted for the aldehyde in the above condensation including cyclic ketones, such as, cyclohexanone where it is desired to prepare spiro derivates. Rather than introducing the cyclic 1,3-sulfur-nitrogen moiety as the final step in the synthesis, an aldehyde or ketone dye intermediate may be condensed with the selected SH-Z-$NHR^1$ compound and the condensation product then reacted with the appropriate molecule to yield the final dye product.

The subject dye compounds containing a linking group to connect the dye radical and the cyclic 1,3-sulfur-nitrogen moiety may be prepared using the procedures previously employed in the synthesis of dye developers containing a linking group, such as, those described in aforementioned U.S. Pat. No. 3,255,001 and the other patents enumerated above. As adapted for use in the present invention, an aldehyde or ketone is substituted for the developer unit in the prior methods and the product obtained upon reaction with a dye, which comprises the aldehyde or ketone linked to the dye by a divalent organic radical, is condensed with the selected SH—Z—$NHR^1$ compound to yield the final dye product. For example, an aldehyde or ketone possessing an —$NH_2$ substituent, such as, $NH_2$—A—CHO may be reacted with a dye possessing an —$So_2Cl$, —COCl or —COOR substituent attached directly or indirectly to the chromophoric system comprising the dye, such as, D-$(A')_{p-1}$-$SO_2Cl$ to yield D-$(A')_{p-1}$-$SO_2NH$-A-CHO, which is then condensed with the selected SH-Z-$NHR^1$ compound to give the final dye product,

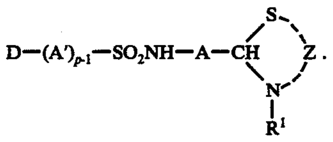

Conversely, the aldehyde or ketone may possess the —$SO_2Cl$, —COCl or —COOR substituent and the dye may be substituted with the —$NH_2$ group. When using an aldehyde possessing an amino substituent, i.e., $NH_2$—A—CHO, it may be desirable to block the amino or the aldehyde function. For example, rather than using an aldehyde, an acetal, such as aminobutyraldehyde diethylacetal, may be reacted with the dye and the reaction product hydrolyzed to the aldehyde prior to condensation with the SH—Z—$NHR^1$ compound. In another variation, the final dye product may be "built-up" by condensing an aldehyde or ketone with the SH—Z—$NHR^1$ compound and then reacting the condensation product with the appropriate molecule or molecules to yield the final product. Still other procedures for preparing the subject compounds and further variations of those given above will be apparent to those skilled in the art.

The following detailed examples are given to illustrate the preparation of the preferred compounds within the scope of this invention, and are not intended to be in any way limiting.

EXAMPLE 1

Preparation of the compound of Formula 1

(a) 52 grams of aniline hydrochloride was dissolved in 165 cc. of 40% hydrochloric acid and cooled to about 0° C. 28 grams of sodium nitrite was sowly added while maintaining the temperature below 5° C. After stirring for one hour, a solution of 50 grams of salicylaldehyde dissolved in 270 cc. of 10% potassium hydroxide was added. Stirring was continued for approximately 15 minutes. Hydrochloric acid was added to precipitate the aldehydic azo dye which was then recrystallized from ethanol.

(b) 15.2 grams of N-decylamino ethanethiol and 15.8 grams of 2-hydroxy-p-phenylazo benzaldehyde prepared in step (a) was dissolved in 250 ml. of ethanol. The solution was stirred overnight. The title compound, which precipitated out, was recrystallized from ethanol, melting range 65°-66.5° C.

In addition to the above, the specific dyes of formulas 2, 3, 5-7, 9-29, 41 and 44 also were prepared in accordance with the foregoing procedure by condensing the appropriate aldehydic dye, including those containing a linking group connecting the dye and —CHO, with the selected 2-aminoethanethiol.

The dye of formula 8 also was prepared in the same manner except that the dye condensed with the selected aminoethanethiol was a ketone dye, specifically,

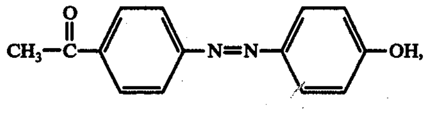

rather than an aldehyde dye.

The dye compounds containing the linking group, —$SO_2$—$NHCH_2$—, were prepared by reacting aminoacetaldehyde diethylacetal with the specified dye possessing an —$SO_2Cl$ substituent followed by hydrolysis of the reaction product to the corresponding aldehyde. The aldehyde thus obtained was then condensed with decylaminoethanethiol as detailed in the following example.

EXAMPLE 2

Preparation of the Compound of Formula 5

The dye acetal having the formula

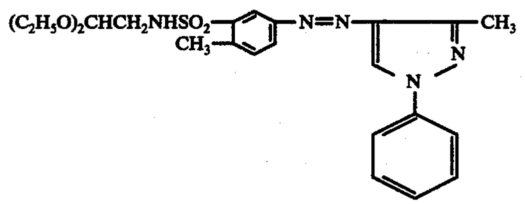

was prepared in a conventional manner using Hinsberg conditions by reacting the corresponding —$SO_2Cl$ substituted dye with a slight excess of aminoacetaldehyde diethylacetal in 10% aqueous sodium hydroxide.

The dye acetal (10 gms., 0.0217 mole) prepared above and decylaminoethanethiol (4.5 gms., 0.0208 mole) were combined with 1 cc. of water, and then 30 cc. of trifluoroacetic acid as slowly added with stirring. After standing overnight, the solvent was stripped and the residue was dissolved in chloroform. The organic solution was shaken with aqueous sodium carbonate and the aqueous layer was separated from the organic phase and extracted with additional chloroform. The organic solutions were combined, and after drying, the solvent was stripped leaving an oil which was chromatographed on fluorisil. Using chloroform as the eluant, the lead band was separated and collected and the product recrystallized from ethanol and dried to give 4 gms. of the title compound.

The dye compounds of formulas 7 and 20 were prepared according to the procedure given in example 2 except that the specified dye was substituted with —COCl instead of $—SO_2Cl$.

Those compounds containing phenylene-sulfonamido linking groups were prepared as detailed in Examples 3 and 4 below.

EXAMPLE 3

Preparation of the Compound of Formula 14

Para-nitrobenzaldehyde was reacted with one equivalent of ethylene glycol by refluxing in ethanol in the presence of an acid catalyst to give the nitro acetal,

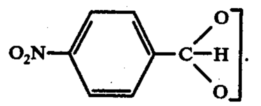

The nitro acetal was converted to the corresponding amino acetal by reduction with hydrogen using palladium-on-carbon catalyst in dioxane.

One equivalent of this amino acetal was reacted with one equivalent of

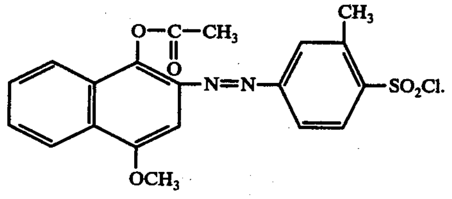

After standing at room temperature for 1.5 hours, water was added, and the mixture heated to hydrolyze the acetate. The mixture was evaporated in vacuuo, dissolved in ethanol, and then 0.1M hydrochloric acid was added. The solid that precipitated out was the aldehyde

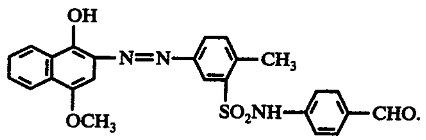

This aldehyde and one equivalent of decylaminoethanethiol were dissolved in toluene and refluxed with a Dean Stark trap overnight. The solvent was evaporated in vacuuo, and the resulting oil was chromatographed on fluorisil with chloroform as eluant. The first band was separated and collected to give the title compound.

EXAMPLE 4

Preparation of the compound of formula 41

(a) Para-toluenesulfonyl chloride (45 gms. 0.238 mole) was dissolved in a mixture of glacial acetic acid (375 cc.) and acetic anhydride (375 cc.), and the solution was brought to 0° -5° C. While maintaining the temperature in this range, conc. sulfuric acid (56 gms.) was slowly added. Chromium trioxide (66 gms., 0.66 mole) was ground in a mortar and pestle and added in portions with stirring. During the addition the temperature was maintained between about 9° and 12° C. (one large addition of the chromium trioxide brought the temperature up to 15.5° C). The reaction mixture was stirred for one-half hour and then added to a large quantity of ice. The mixture was filtered and the solid collected was extracted with cold methylene chloride leaving behind some solid presumably, $ClSO_2—C_6H_4CO_2H$. The methylene chloride extract was dried over magnesium sulfate and then stripped. The solid remaining was recrystallized from acetone-hexane to give the sulfonyl chloride

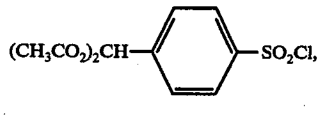

melting range 112° -113° C.

(b) N-(2-aminoethyl)N-ethyl-m-toluidine (19 gms., 0.107 mole) was dissolved in about 300 cc. of dioxane and cooled to 10° -15° C. While stirring and maintaining the temperature in this range, the sulfonyl chloride prepared in (a) above (33 gms. 0.108 mole) was added in portions and then 8.8 gms. of 50% aqueous sodium hydroxide solution was added dropwise. The mixture was stirred at room temperature overnight. The solid sodium chloride was filtered off and then the solvent was stripped. The oily residue was crystallized from ethanol giving a total of 29.5 gms. of

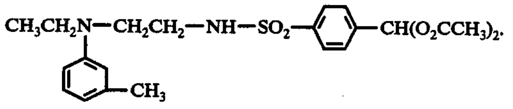

(c) The product of step (b) (9 gms., 0.021 mole) was dissolved in a mixture of 75 mls. ethanol, 25 mls. water and 12.5 mls. conc. hydrochloric acid. The temperature was brought to 5° C. The mixture was heterogeneous. A solution of 1.45 gms. (0.021 mole) of sodium nitrite dissolved in 5 mls. of water was slowly added to the mixture with the stirring. After about 30 minutes a precipitate of unreacted starting material was removed by filtration. The filtrate was made alkaline with conc. ammonium hydroxide. The mixture was partitioned between chloroform and water. The chloroform layer was dried over magnesium sulfate, filtered and evaporated leaving the product

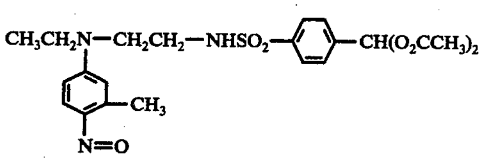

as a dark green oil.

(d) The product of step (c) was dissolved in 75 mls. of pyridine and one equivalent of

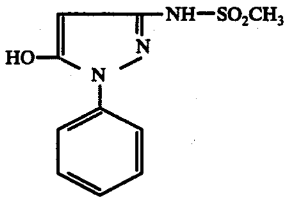

was added and the mixture allowed to stand at room temperature for 20 hours. The pyridine was removed by evaporation in vacuuo. The crude material was purified by chromatography on fluorisil using chloroform and ethylacetate as eluants to give 2 gms. of the product

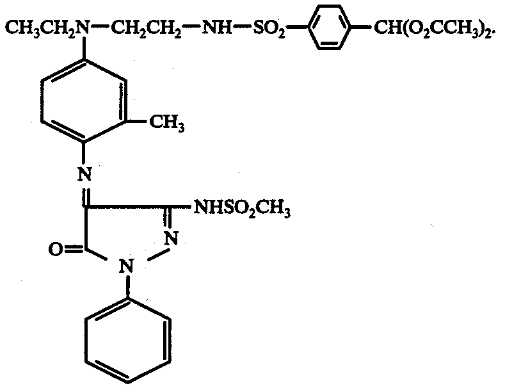

(e) The product of step (d) was stirred overnight in an aqueous ethanol solution of sodium carbonate. The ethanol was removed in vacuuo. Acetic acid was added, and the precipitate that formed was collected to give 1.8 gms. of the corresponding aldehyde

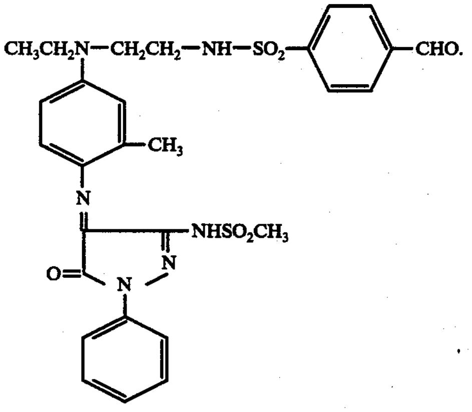

(f) This aldehyde (2.96 m moles) and 1,1-dimethyl-2-octadecylaminoethanethiol hydrochloride (2.9 m moles) were dissolved in a solution of 50:50 chloroform-ethanol, and one equivalent of sodium bicarbonate was added. The mixture was stirred at room temperature for 2 days. The solvents were evaporated, and the crude material was purified by chromatography on fluorisil using chloroform and diethyl ether to give the title compound.

EXAMPLE 5

Preparation of the compound of formula 4

The dye of formula 11 was prepared following the procedure of Example 1 and isolated from the reaction mixture as the hydrochloride.

This dye (1.7 gms., 0.0052 mole) and ethyl isocyanate (0.6 gms., 0.0085 mole) were combined and stirred in 75 mls. of pyridine for about one hour. The solution was warmed on a steam bath for 15 minutes, cooled and the solvent was stripped leaving an oil. NMR indicated the presence of two ethyl groups per dye moiety. Presumably both the phenolic OH and the thiazolidine N underwent reaction.

The oil was dissolved in 25 mls. of glacial acetic acid and heated on a steam bath for about 20 minutes. Water was added to give a saturated solution of product. Upon cooling a yellow solid formed which had an NMR consistent with the desired product. The yellow solid was then recrystallized from ethanol-water and dried to give 1.2 gms. of the title compound, melting point 204° C. (dec.).

In addition to the above, the specific dye compounds of formulas 42, 46 and 50 were prepared employing the intermediate,

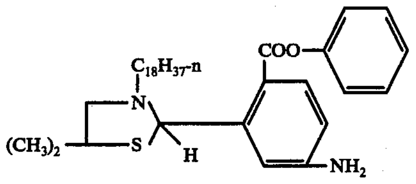

This intermediate (designated Compound A for convenience), was prepared as follows:

(1) 1,1-dimethyl-2-octadecylaminoethanethiol hydrochloride (2.55 moles) and 5-nitrosalicylaldehyde (2.55 moles) were dissolved in 9 liters of ethanol and 214 gms. of sodium bicarbonate were added. The mixture was stirred at room temperature for 3 days. filtered, washed with ethanol and air dried giving 1224 gms. of pale yellow solid. 1214 gms. of this solid were dissolved in 9 liters of chloroform with stirring, and the solution was filtered through dacron removing 158.4 gms. of insoluble material. The filtrate containing 1055.6 gms. (2.08 moles) of 2-(2'-hydroxy-5'-nitrophenyl)-3-octadecyl-5,5-dimethylthiazolidine in about 9 liters of chloroform was used directly in step 2.

(2) To the filtrate of step 1 was added 316.5 gms. (2.25 moles) of benzoyl chloride, and then 230 gms. (2.27 moles) of triethylamine was added with stirring. A slight exotherm was observed. Stirring was continued for 3.5 hours at which time TLC showed that no starting material remained. The chloroform was stripped leaving a yellow semi-solid which was dissolved in 5.5 liters of ethanol and brought to reflux. The mixture, in a 12 liter round bottom flask, was stirred mechanically and cooled gradually to about 38° C. at which point the solution began to turn cloudy. Cooling was aided by a stream of water directed against the side of the flask, and the temperature was monitored by an internal thermometer. When the solution began to cloud, it was seeded with 1 gram of product and stirring was continued while the product crystallized. After the solution cooled to room temperature, the product was filtered, washed four times with 500 ml. portions of ethanol and air dried to give 1032.8 gms. of very pale yellow solid, melting range 44°-45° C.

(3) 50 gms. (0.082 mole) of the product of step 2 were added to a stirring mixture of 500 mls. of ethyl acetate, 50 mls. of hydrochloric acid and 50 mls. of acetic acid at room temperature. 19 gms. of zinc powder were then added in portions. The first few additions brought the temperature up to about 45° C., and thereafter, the temperature was maintained between about 40° and 45° C. by water bath cooling. After the addition of zinc was complete, TLC showed that no starting material remained.

150 gms. of $NaHCO_3$ in 1 liter of water were added to a 3 liter flask and the reaction solution, with stirring, was filtered into the flask through No. 515 paper. An additional 100 gms. of $NaHCO_3$ were added which caused substantial foaming and eventual precipitation of a white solid. The organic and aqueous layers were separated and the insolubles filtered from the organic (ethylacetate) layer. The filtrate was dried over magnesium sulfate and then stripped leaving a yellow oil.

450 mls. of ethanol were then added to the flask containing the oil, and the mixture was stirred at room temperature for about 15 minutes. An insoluble yellow gum was filtered off using celite and the solution cooled in an icewater bath for 5 to 10 minutes. An additional amount of yellow gum formed, and the solution was again run through celite. After some preliminary scratching to induce crystallization, the filtrate was placed in a freezer at about −15° C. and in about four hours, precipitation of the product was complete. The solution was then filtered and the precipitate washed with a small amount of ethanol and dried under vacuum to give 30.5 gms. of the title compound, melting range 59° -60° C.

The dyes used as starting materials in Examples 6 to 8 below are shown in the following formulas:

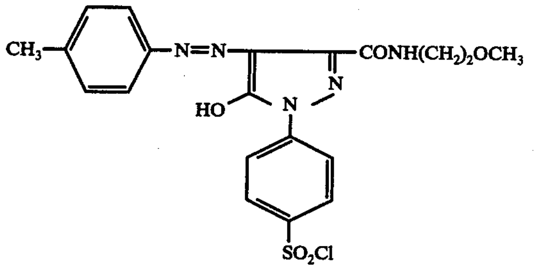

DYE I

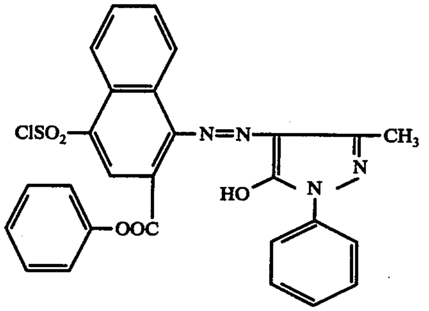

DYE II

-continued

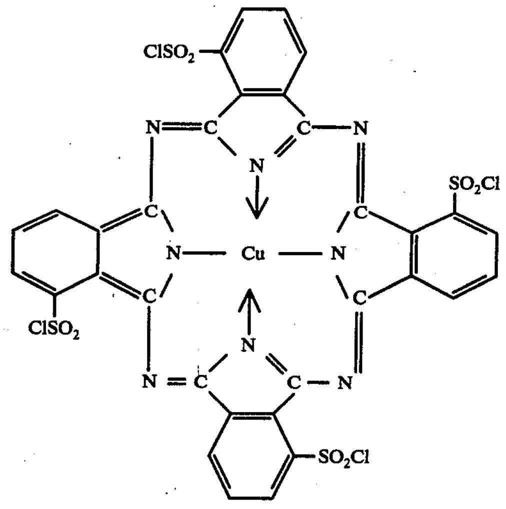

DYE III

EXAMPLE 6

Preparation of the compound of formula 42

(1) 800 mls. of tetrahydrofuran were placed in a 2 liter round bottom flask equipped with a mechanical stirrer and reflux condenser. 95.2 gms. (0.164 mole) of Compound A, 75.3 gms. (0.157 mole) of Dye I and 17.0 gms. (0.215 mole) of pyridine were added at room temperature and the mixture brought to reflux. After refluxing for 15 minutes, the mixture was allowed to cool to room temperature overnight and then filtered to remove insolubles. The tetrahydrofuran was removed leaving a yellow solid which was taken up in 1500 mls. of isopropanol. the isopropanol solution was brought to reflux using steam heat and the hot solution was filtered and then cooled to room temperature. The yellow precipitate was fltered, washed with isopropanol and dried. The material that was filtered from the hot solution was combined with the yellow precipitate to give a total of 108 gms. of solid.

(2) 86.3 gms. (0.085 mole) of the product obtained in step 1 were placed in a mixture of 800 mls. of methanol and 80 mls. of tetrahydrofuran in a 5 liter flask. A solution of 43 gms. of potassium hydroxide in 250 mls. of water was slowly added to the mixture with stirring. The resulting solution was cooled in an ice bath and brought to pH 6 by the addition of 525 mls. of 10% hydrochloric acid. The solution was filtered through medium sintered glass and the precipitate washed with methanol, then with water and dried giving 76.3 gms. of yellow product. This material was placed in 1200 mls. of isopropanol and the solution brought to reflux with stirring. The solution was then cooled to room temperature, filtered and washed giving 71 gms. of the title compound, melting range 193°-194° C.

EXAMPLE 7

Preparation of the compound of formula 46

(1) A mixture of 10.4 gms. (0.0179 mole) of Compound A and 9.8 gms. (0.0179 mole) of Dye II in 150 mls. of dry pyridine was stirred at room temperature for one-half hour. The reaction mixture was filtered, and the filtrate poured with stirring into 150 mls. of glacial acetic acid, ice and water. The precipitate formed was filtered, washed with water until the water was clear (not yellow), and air dried. The precipitate was recrystallized from methylcellosolve by cooling overnight and trituration. Then it was filtered, washed with methanol and dried to give 10.8 gms. of an orange solid, melting range 111°-114° C.

(2) A mixture of 2.67 gms. (0.01 mole) of $CrCl_3.6H_2O$, 50 mls. of dry N,N-dimethylformamide (DMF) and 35 mls. of benzene was azeotroped for two hours at which time the theoretical amount of water (1.08 mls.) had been collected. Then the benzene, about 32 mls., was removed by distillation. The reaction was removed from the heat, and a solution of 5.45 gms. (0.005 mole) of the orange solid obtained in step 1 in 50 mls. of dry DMF was added all at once. The reaction mixture was then stirred and heated on a steambath for 24 hours, cooled to room temperature and filtered to remove insoluble white solid. The filtrate was then poured into a mixture of 85 mls. concentrated hydrochloric acid, 350 mls. water and 50 gms. ice with stirring. The precipitate was filtered, washed with water and dried in vacuo to give 5 gms. of red-brown solid.

(3) A mixture of 5 gms. (0.00443 mole) of the red-brown solid obtained in step 2 and 0.568 gm. (0.0045 mole) of acetylcyclopentanone and 2.24 gms. of Amberlite IR-45 Resin in 60 mls. of methylcellosolve was stirred at 70°-75° C. for 6 hours. The mixture was filtered hot and the resin was washed with 40 mls. of hot methylcellosolve. The combined filtrate and methylcellosolve wash were heated to about 80°-90° C., and with rapid stirring, 300 mls. of hot water (80°-90° C.) were added. The mixture was slowly cooled to room temperature with stirring and then cooled in an ice bath. The precipitate was filtered, washed with water and dried to give 4.8 gms. of product.

(4) A solution of 3 gms. of 50% aqueous sodium hydroxide was added to a solution of 4.8 gms. (0.0041 mole) of the product obtained in step 3 in 50 mls. methylcellosolve. The mixture was stirred at room temperature for one hour. The reaction mixture was then poured with stirring into a mixture of 10 mls. concentrated hydrochloric acid, 100 mls. water and 100 gms ice. The precipitate formed was filtered, washed with water, with dilute aqueous sodium bicarbonate and again with water and then pressed dry. The wet cake was dissolved in 100 mls. of boiling isopropanol and left at room temperature overnight. The isopropanol solution was filtered and the filtrate heated to boiling. Then with stirring, 300 mis. of hot water (80°-90° C.) was added to the hot filtrate and the mixture cooled to room temperature with stirring and then cooled in a ice bath. The mixture was filtered, and the precipitate washed with water and dried in vacuo at 50° C. to give 3.1 gms. of title compound as a red-brown solid.

EXAMPLE 8

Preparation of the Compound of Formula 50

(1) 18.0 gms. of Dye III were added in portions over about one-half hour to a stirred solution of 54.0 gms. of Compound A and 40.5 gms. of N,N-diisopropylamine in 350 mls. of chloroform at room temperature. After addition was complete, the solution was brought to reflux and stirred at reflux overnight. The solution was then reduced to 250 mls. by boiling, cooled to room temperature and poured into 3.5 liters of hexane with rapid stirring to precipitate the product. The green chloroform-hexane supernatant was decanted leaving a gummy precipitate. Fresh hexane was added and the precipitate converted to an easily filterable solid with trituration. After filtering, washing with hexane and drying, the crude product was placed in 100 mls. of 10% aqueous sodium bicarbonate and the solution stirred rapidly overnight. The product, which was insoluble in the bicarbonate solution, was filtered, washed with water and dried over phosphorus pentachloride. The product was then placed in 100 mls. of 10% hydrochloric acid solution, and the solution heated with stirring on a steambath for 15 minutes, cooled and filtered. The product collected by filtering was placed in a Sohxlet extractor and extracted with isopropanol. Further extraction with isopropanol followed by removal of the insolubles and drying gave 27 gms. of green-blue solid.

(2) The solid obtained in step 1 was added in portions to 550 mls. of tetrahydrofuran with stirring. After addition was complete, stirring was continued until all of the solid had dissolved. Then 12 gms. of potassium hydroxide in 200 mls. of distilled water was slowly added to the solution at room temperature. The mixture was stirred for two hours at room temperature and then refluxed for 15 minutes. 50 mls. of methanol were added to the mixture and refluxing continued. Then 100 mls. of water and 2 gms. of potassium hydroxide were added. The mixture was cooled, neutralized to pH 1 with 40% hydrochloric acid, filtered through dacron and dried giving 22 gms. of crude product.

The crude material was dissolved in a mixture of 20 mls. N,N-dimethylformamide and 300 mls. of tetrahydrofuran, and this solution was poured into 1400 mls. of aqueous 5% sodium bicarbonate with rapid stirring. After allowing the precipitate to settle, the supernatant was decanted and the precipitate washed several times by adding bicarbonate solution and decanting. The precipitate was then filtered through dacron and washed with water. The solids remaining suspended in the supernatant and washes were recovered by centrifuging and combined with the precipitate. This product was completely water insoluble. The product was then placed in 1 liter of 10% hydrochloric acid, heated on a steambath, filtered through dacron, washed and dried giving 14.7 gms. of the title compound as a blue solid. Elemental analysis, electrophoresis and molecular weight determinations indicated an average of two thiazolidine substituents per molecule of copper phthalocyanine.

It will be appreciated that other dyes and other dye intermediates, for example, other azo dyes or anthraquinone dyes, azomethine dyes, phthalocyanine dyes and metal-complexed azo and azomethine dyes, such as, those commonly employed in photographic processes for producing color images may be substituted for the dyes and dye intermediates employed in the foregoing examples. Also, dye compounds containing different divalent organic linking groups may be obtained, for example, by substituting an amino-substituted cyclohexanone in the above examples for the aminoacetaldehyde diethylacetal or aminosalicylaldehyde, reacting the cyclohexanone with the appropriately substituted dye and then condensing with the selected $SH\text{-}Z\text{-}NHR^1$ compound. The condensation of cyclohexanone with a 2-aminoethanethiol to form thiazolidines is well known and has been described by T. Taguchi et al., J. Amer. Chem. Soc., 81, p. 4322 (1959); G. Stacey et al., J. Het. Chem., 5, p. 101 (1968) and R. Klink et al., Chem. Abs., 55, 27325 (1961).

Rather than a 2-aminoethanethiol, other appropriate amino-mercapto compounds may be used in the condensation reactions of the above examples to obtain the desired cyclic 1,3-sulfur-nitrogen moiety. For example, ortho-aminothiophenol may be substituted for the 2-aminoethanethiols used above to give the corresponding benzothiazoline moieties. Alternatively, dye compounds containing a benzothiazoline moiety may be prepared by reduction of a benzothiazolium compound, either a dye or dye intermediate. For example, the dye intermediate,

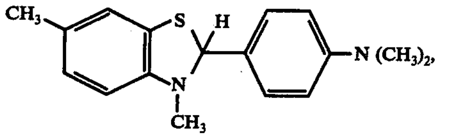

was prepared by treating Basic Yellow 1 having the formula,

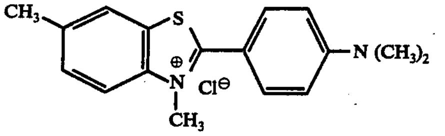

with sodium borohydride as follows:

Basic yellow 1 (0.028 mole) was dissolved in hot ethanol and the solution filtered. The purified compound was isolated from the filtrate upon cooling and was added to 400 cc. of ethanol. The ethanol solution was cooled to 5°-10° C., and sodium borohydride (0.024 mole) in about 50 cc. of water was slowly added to the ethanol solution while maintaining the temperature below about 10° C. A precipitate formed, and after about 10 minutes, the mixture was filtered. The precipitate was added to ethanol and the mixture acidified to a pH of about 2 with hydrochloric acid. Upon the addition of water, a yellowish precipitate formed which had an nmr consistent with the desired product. About 4.5 gms. of precipitate was collected and was recrystallized from dioxane-water to give pale yellow needle-like crystals. The crystalline product was then washed with water to remove the yellow color (melting range 142°-145° C.)

It will be appreciated that benzothiazolium compounds containing a dye moiety, for example, an azo dye moiety may be substituted for Basic Yellow 1 in the foregoing procedure to yield a dye product containing benzothiazoline as the cyclic 1,3-sulfur-nitrogen moiety.

The following compounds were also made using the above procedure.

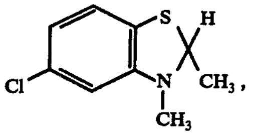

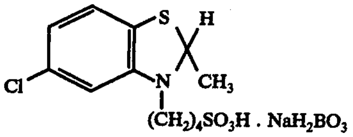

and

-continued

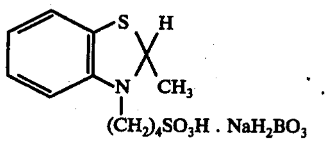

Reductions similar to the above procedure have been reported by Clarke and Sykes, J. Chem. Soc., C., p. 1411 (1967); ibid. p. 103 (1967).

Since certain changes may be made in the above products and processes without departing from the scope of the invention herein involved, it is intended that all matter contained in the above description shall be interpreted as illustrative and not in a limiting sense.

What is claimed is:

1. A dye substituted with a cyclic moiety containing the group

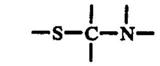

included in the ring and capable of undergoing cleavage between the S atom and the C atom common to the S and N atoms and between the N atom and the common C atom in the presence of silver ions, soluble silver complex or silver ions and soluble silver complex having the formula $$D' - [(L')_{m-1}Y']_n$$

wherein D' represents the radical of an organic dye; *m* is a positive integer 1 or 2; *n* is a positive integer from 1 to 4; L' represents a divalent organic linking group selected from

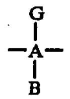

and

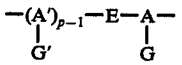

wherein A and A' each are selected from alkylene containing 1 to 6 carbon atoms, phenylene, phenylenealkylene, alkylenephenylene, phenylenealkylenephenylene and alkylenephenylenealkylene; B is selected from alkylsulfonamido and alkylcarboxamido wherein said alkyl groups contain 1 to 6 carbon atoms; E is selected from —CONH—, —$SO_2$NH—, —NHCO— and —NH$SO_2$—; G and G' each is hydrogen or a group selected from amino, hydroxy, carboxy and sulfo; *p* is a positive integer 1 or 2; and Y' is a cyclic moiety selected from (i) 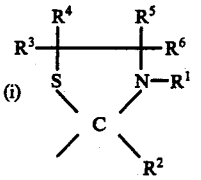 and (ii) 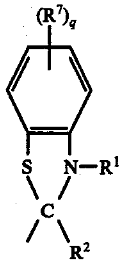

wherein $R^1$ is hydrogen; alkyl containing 1 to 20 carbon atoms, unsubstituted or substituted with —OH, —$SO_3H$, —$COOR^8$, —$SO_2NHR^8$, —$NHCOR^9$, alkoxy containing 1 to 20 carbon atoms, —N,N-dialkylamino wherein said alkyl groups contain 1 to 20 carbon atoms, phenyl, unsubstituted or substituted with —OH, —$SO_3H$, —$COOR^8$, —$SO_2NHR^8$, alkoxy having 1 to 20 carbon atoms, —N,N-dialkylamino wherein said alkyl groups contain 1 to 20 carbon atoms, alkyl containing 1 to 20 carbon atoms and alkenyl containing 1 to 20 carbon atoms; —$COR^9$; and —$CONHR^9$, said $R^8$ being hydrogen or alkyl containing 1 to 20 carbon atoms and said $R^9$ being alkyl containing 1 to 20 carbon atoms; $R^2$ is hydrogen, alkyl containing 1 to 20 carbon atoms, phenyl or phenyl substituted with alkyl containing up to 20 carbon atoms; $R^3$, $R^4$, and $R^5$ each are hydrogen or alkyl containing 1 to 20 carbon atoms and $R^4$ and $R^5$ taken together are $-(CH_2)_4-$; $R^6$ is hydrogen, carboxy, sulfo or alkyl containing 1 to 20 carbon atoms; $R^7$ is hydrogen, alkyl containing 1 to 20 atoms, carboxy, sulfo or halo selected from chloro and bromo; and $q$ is an integer 1 to 4, said cyclic moiety being attached to an aromatic nuclear carbon atom of said D' by a single covalent bond when $m$ is 1 and being attached to a carbon atom of said A of said divalent organic linking group by a single covalent bond when $m$ is 2 and said C atom common to said S and N atoms of said cyclic moiety being a tetrahedral carbon atom possessing 4 single covalent bonds.

2. A dye as defined in claim 1 wherein $m$ is 1.

3. A dye as defined in claim 1 wherein $m$ is 2.

4. A dye as defined in claim 3 wherein said L' is

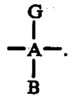

5. A dye as defined in claim 4 wherein said B is alkylsulfonamido and said G is hydrogen.

6. A dye as defined in claim 3 wherein said L' is

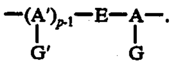

7. A dye as defined in claim 6 wherein said $p$ is 1.

8. A dye as defined in claim 7 wherein said A is alkylene.

9. A dye as defined in claim 8 wherein said E is —CONH—.

10. A dye as defined in claim 8 wherein said E is —$SO_2NH$—.

11. A dye as defined in claim 7 wherein said A is phenylene.

12. A dye as defined in claim 11 wherein said E is —$SO_2NH$—.

13. A dye as defined in claim 12 wherein said G is hydroxy.

14. A dye as defined in claim 1 wherein said Y' is said cyclic moiety (i).

15. A dye as defined in claim 1 wherein said Y' is said cyclic moiety (ii).

16. A dye as defined in claim 1 wherein said D' represents the dye radical of an azo dye.

17. A dye as defined in claim 1 wherein said D' represents the dye radical of a metal-complexed azo dye.

18. A dye as defined in claim 1 wherein said D' represents the dye radical of a metal-complexed phthalocyanine dye.

19. A dye as defined in claim 1 wherein said D' represents the dye radical of an azomethine dye.

20. A dye as defined in claim 1 wherein said D' represents the dye radical of an anthraquinone dye.

21. An azo dye substituted with a cyclic moiety containing the group

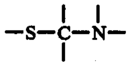

included in the ring and capable of undergoing cleavage between the S atom and the C atom common to the S and N atoms and between the N atom and the common C atom in the presence of silver ions, soluble silver complex or silver ions and soluble silver complex having the formula $$D'-[(L')_{m-1}Y']_n$$

wherein D' represents the radical of an azo dye; $m$ is a positive integer 1 or 2; $n$ is a positive integer 1 or 2; L' represents a divalent organic linking group selected from

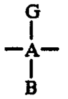

and 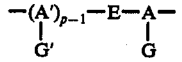

wherein A and A' each are selected from the alkylene containing 1 to 6 carbon atoms, phenylene, phenylenealkylene, alkylenephenylene, phenylenealkylenephenylene and alkylphenylenealkylene; B is selected from alkylsulfonamido and alkylcarboxamido wherein said alkyl groups contain 1 to 6 carbon atoms; E is selected from —CONH—, —$SO_2NH$—, —NHCO—, and —$NHSO_2$—; G and G' each is hydrogen or a group selected from amino, hydroxy, carboxy, and sulfo; $p$ is a positive integer 1 or 2; and Y' is a cyclic moiety selected from (i) 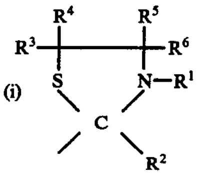 and (ii) 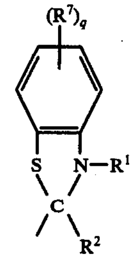

wherein $R^1$ is hydrogen; alkyl containing 1 to 20 carbon atoms, unsubstituted or substituted with —OH, —$SO_3H$, —$COOR^8$, —$SO_2NHR^8$, —$NHCOR^9$, alkoxy containing 1 to 20 carbon atoms, —N,N-dialkylamino wherein said alkyl groups contain 1 to 20 carbon atoms; phenyl, unsubstituted or substituted with -OH, —$SO_3H$, —$COOR^8$, —$SO_2NHR^8$, alkoxy having 1 to 20 carbon atoms, —N,N-dialkylamino wherein the alkyl groups contain 1 to 20 carbon atoms, alkyl containing 1 to 20 carbon atoms and alkenyl containing 1 to 20 carbon atoms; —$COR^9$; and —$CONHR^9$, said $R^8$ being hydrogen or alkyl containing 1 to 20 carbon atoms and said $R^9$ being alkyl containing 1 to 20 carbon atoms; $R^2$ is hydrogen, alkyl containing 1 to 20 carbon atoms, phenyl or phenyl substituted with alkyl containing up to 20 carbon atoms; $R^3$, $R^4$, and $R^5$ each are hydrogen or alkyl containing 1 to 20 carbon atoms and $R^4$ and $R^5$ taken together are $-(CH_2)_4$, $R^6$ is hydrogen, carboxy, sulfo or alkyl containing 1 to 20 carbon atoms; $R^7$ is hydrogen, alkyl containing 1 to 20 carbon atoms, carboxy, sulfo or halo selected from chloro and bromo; and *q* is an integer 1 to 4, said cyclic moiety being attached to an aromatic nuclear carbon atoms of said D' by a single covalent bond when *m* is 1 and being attached to a carbon atom of said A of said divalent organic linking group by a single covalent bond when *m* is 2, and said C atom common to said S and N atoms of said cyclic moiety being a tetrahedral carbon atom possessing 4 single covalent bonds.

22. A dye as defined in claim 21 wherein *m* is 1.

23. A dye as defined in claim 21 wherein *m* is 2.

24. A dye as defined in claim 23 wherein said L' is

25. A dye as defined in claim 24 wherein said B is alkylsulfonamido and said G is hydrogen.

26. A dye as defined in claim 23 wherein said L' is

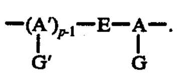

27. A dye as defined in claim 26 wherein said *p* is 1.

28. A dye as defined in claim 27 wherein said A is alkylene.

29. A dye as defined in claim 28 wherein said E is —CONH—.

30. A dye as defined in claim 28 wherein said E is —$SO_2NH$—.

31. A dye as defined in claim 27 wherein said A is phenylene.

32. A dye as defined in claim 31 wherein said E is —$SO_2NH$—.

33. A dye as defined in claim 32 wherein said G is hydroxy.

34. A dye as defined in claim 21 wherein said Y' is said cyclic moiety (i).

35. A dye as defined in claim 21 wherein said Y' is said cyclic moiety (ii).

36. A dye substituted with a group selected from (i) 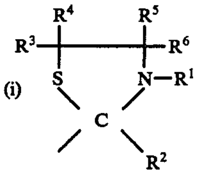 and (ii) 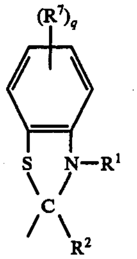

wherein $R^1$ is hydrogen; alkyl containing 1 to 20 carbon atoms, unsubstituted or substituted with —OH, —$SO_3H$, —$COOR^8$, —$SO_2NHR^8$, —$NHCOR^9$, alkoxy containing 1 to 20 carbon atoms, —N,N-dialkylamino wherein said alkyl groups contain 1 to 20 carbon atoms; phenyl, unsubstituted or substituted with —OH, —$SO_3H$, —$COOR^8$, —$SO_2NHR^8$, alkoxy having 1 to 20 carbon atoms, —N,N-dialkylamino wherein the alkyl groups contain 1 to 20 carbon atoms, alkyl containing 1 to 20 carbon atoms and alkenyl containing 1 to 20 carbon atoms; —$COR^9$; and —$CONHR^9$, said $R^8$ being hydrogen or alkyl containing 1 to 20 carbon atoms and said $R^9$ being alkyl containing 1 to 20 carbon atoms; $R^2$ is hydrogen, alkyl containing 1 to 20 carbon atoms, phenyl or phenyl substituted with alkyl containing up to 20 carbon atoms; $R^3$, $R^4$, and $R^5$ each are hydrogen or alkyl containing 1 to 20 carbon atoms and $R^4$ and $R^5$ taken together are $-(CH_2)_4$; $R^6$ is hydrogen, carboxy, sulfo or alkyl containing 1 to 20 carbon atoms; $R^7$ is hydrogen, alkyl containing 1 to 20 carbon atoms, carboxy, sulfo or halo; and *q* is an integer 1 to 4, said groups (i) and (ii) being attached to a carbon atom of said dye and being capable of undergoing cleavage between said S atom and said C atom common to said S and N atoms and between said N atom and said common C atom in the presence of silver ions, soluble silver complex or silver ions and soluble silver complex, said C atom common to said S and N atoms of said groups (i) and (ii) being a tetrahedral carbon atom possessing 4 single covalent bonds.

37. A dye as defined in claim 36 wherein $R^2$ is hydrogen.

38. A dye as defined in claim 36 wherein $R^2$ is alkyl.

39. A dye as defined in claim 36 wherein $R^3$ and $R^4$ are alkyl.

40. A dye as defined in claim 36 wherein $R^4$ and $R^5$ are $-CH_2)_4$.

41. The compound

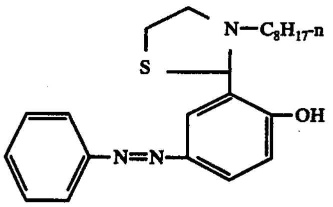
42. The compound
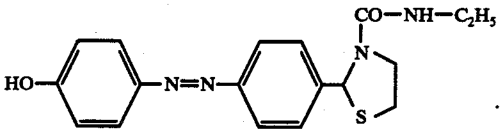
43. The compound
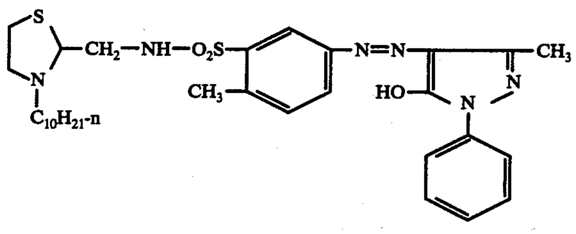
44. The compound
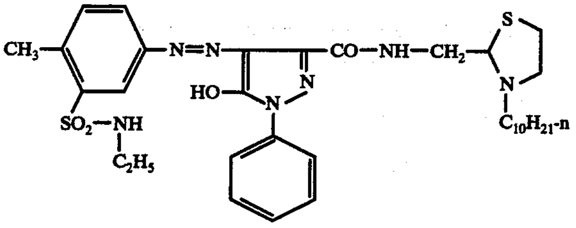
45. The compound
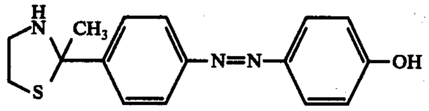
46. The compound
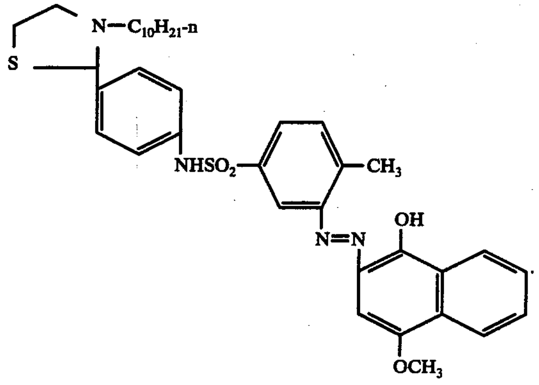
47. The compound
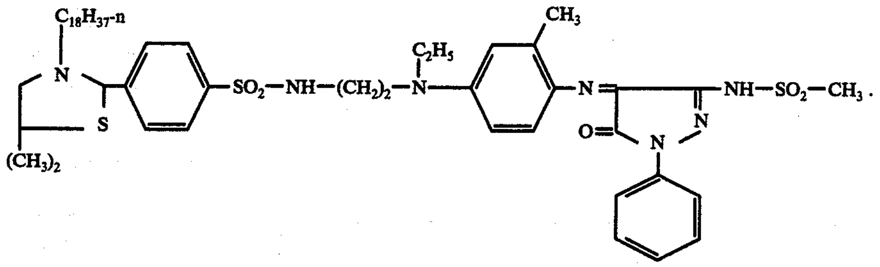
48. The compound
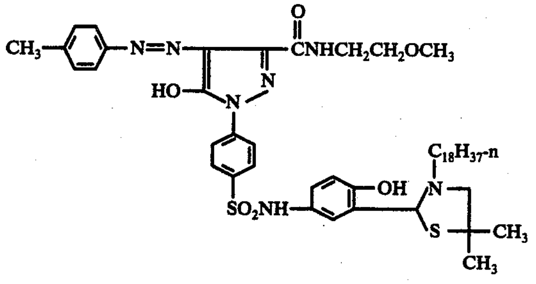
49. The compound

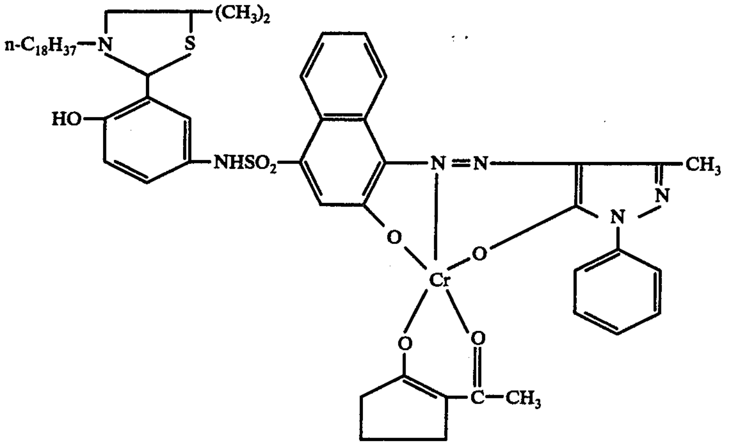
50. The compound
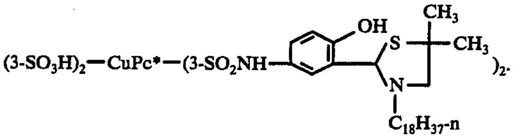
*CuPc = copper phthaloxyanine
* * * * *